(12) United States Patent
Riddell

(10) Patent No.: US 8,434,209 B1
(45) Date of Patent: May 7, 2013

(54) ANIMAL DETERRENT DEVICE WITH INSULATED FASTENERS

(75) Inventor: Cameron A. Riddell, Carson, CA (US)

(73) Assignee: Bird Barrier America, Inc., Carson, CA (US)

( * ) Notice: Subject to any disclaimer, the term of this patent is extended or adjusted under 35 U.S.C. 154(b) by 0 days.

(21) Appl. No.: 13/533,923

(22) Filed: Jun. 26, 2012

Related U.S. Application Data

(63) Continuation of application No. 13/533,846, filed on Jun. 26, 2012.

(51) Int. Cl.
*B21D 39/00* (2006.01)

(52) U.S. Cl.
USPC .................. 29/525.01; 29/525.13; 52/101

(58) Field of Classification Search ............... 29/525.15, 29/525.01, 525.04, 525.09; 256/10; 43/1, 43/98; 119/712, 719, 721, 174, 908; 52/101; 340/573.2, 573.3; 156/71
See application file for complete search history.

(56) References Cited

U.S. PATENT DOCUMENTS

| | | | |
|---|---|---|---|
| 1,956,639 A | 5/1934 | Dana et al. | |
| 1,976,721 A | 10/1934 | Gengler | |
| 2,647,228 A | 7/1953 | Just | |
| 2,989,789 A | 6/1961 | Cohn | |
| 3,294,893 A * | 12/1966 | Shaffer | 174/70 R |
| 3,320,354 A * | 5/1967 | Marley et al. | 174/84 C |
| 3,366,854 A * | 1/1968 | Robinson | 361/232 |
| 3,622,685 A * | 11/1971 | Crowl | 174/44 |
| 3,717,802 A * | 2/1973 | Plevy et al. | 361/232 |
| 4,015,176 A * | 3/1977 | Shanahan et al. | 361/232 |
| 4,053,707 A | 10/1977 | Ely et al. | |
| 4,111,400 A | 9/1978 | Enoksson | |
| 4,186,512 A * | 2/1980 | Berg | 43/98 |
| 4,274,123 A * | 6/1981 | Rogers, Jr. | 361/232 |
| 4,299,048 A * | 11/1981 | Bayes | 43/98 |
| 4,352,007 A * | 9/1982 | Baker et al. | 392/472 |

(Continued)

FOREIGN PATENT DOCUMENTS

| | | |
|---|---|---|
| AU | 2004296785 A1 | 12/2004 |
| CA | 2 548 474 A1 | 6/2005 |

(Continued)

OTHER PUBLICATIONS

Bird Barrier America, Inc., pp. 16-17 of its 1997 Catalog, published in the United States.

(Continued)

*Primary Examiner* — Jermie Cozart
*Assistant Examiner* — Bayan Salone
(74) *Attorney, Agent, or Firm* — Dickstein Shapiro LLP

(57) ABSTRACT

An animal deterrent device and methods for installing and producing an animal deterrent device for delivering an electric shock to an animal, pest, or bird to be deterred, having the typical components of a non-conductive base to which the electrically conductive elements are attached. The bottom layer unfolds outward to allow sewing of the conductive elements to the top layer of the elongated base, while preventing the stitching from penetrating the bottom layer of the elongated base. The bottom layer is then folded back into place after sewing is completed, thereby insulating any hole, fastener, or conductive element that pushed through the top layer of the elongated base from water or other material that may congregate at the bottom exterior, preventing unwanted arcing to the exterior surface below.

10 Claims, 15 Drawing Sheets

U.S. PATENT DOCUMENTS

| | | | |
|---|---|---|---|
| 4,471,561 A * | 9/1984 | Lapierre | 43/108 |
| 4,475,141 A * | 10/1984 | Antonevich | 361/220 |
| 4,494,733 A * | 1/1985 | Olsson | 256/10 |
| 4,533,120 A * | 8/1985 | Ruddock | 256/52 |
| 4,637,164 A | 1/1987 | Brown | |
| 4,706,941 A * | 11/1987 | Sherdan | 256/10 |
| 4,747,229 A | 5/1988 | Chambers | |
| 4,839,984 A * | 6/1989 | Saunders et al. | 43/112 |
| 4,861,645 A * | 8/1989 | Standing | 428/196 |
| 4,862,637 A * | 9/1989 | Dressel | 43/98 |
| 4,949,216 A | 8/1990 | Djukastein | |
| 5,007,196 A | 4/1991 | Saunders et al. | |
| 5,019,438 A | 5/1991 | Rapisarda | |
| 5,031,353 A * | 7/1991 | Gardiner | 43/98 |
| 5,036,166 A * | 7/1991 | Monopoli | 174/128.1 |
| 5,049,704 A * | 9/1991 | Matouschek | 174/261 |
| 5,095,646 A * | 3/1992 | Bunkers | 43/98 |
| 5,096,162 A * | 3/1992 | Cleveland | 256/10 |
| 5,107,620 A * | 4/1992 | Mahan | 43/112 |
| 5,151,319 A * | 9/1992 | Schoutteten | 442/313 |
| 5,153,383 A | 10/1992 | Whited et al. | |
| 5,158,039 A * | 10/1992 | Clark | 119/712 |
| 5,163,658 A * | 11/1992 | Cleveland | 256/10 |
| 5,253,444 A * | 10/1993 | Donoho et al. | 43/1 |
| 5,293,721 A | 3/1994 | Richard et al. | |
| 5,338,007 A * | 8/1994 | Hinton | 256/48 |
| 5,357,049 A * | 10/1994 | Plummer, III | 174/36 |
| 5,366,780 A * | 11/1994 | Rapisarda | 428/102 |
| 5,400,552 A | 3/1995 | Negre | |
| 5,430,255 A | 7/1995 | Downie et al. | |
| 5,433,029 A | 7/1995 | Donoho et al. | |
| 5,446,242 A | 8/1995 | Barrett | |
| 5,570,537 A | 11/1996 | Black et al. | |
| 5,677,674 A * | 10/1997 | Wolf | 340/541 |
| 5,835,332 A * | 11/1998 | White et al. | 361/220 |
| 5,850,808 A * | 12/1998 | Burdick | 119/713 |
| 5,957,434 A | 9/1999 | Nilsson | |
| 5,992,828 A * | 11/1999 | Burdick | 256/10 |
| 6,006,698 A * | 12/1999 | Negre | 119/537 |
| 6,145,236 A * | 11/2000 | King | 43/1 |
| 6,250,023 B1 * | 6/2001 | Donoho | 52/101 |
| 6,283,064 B1 * | 9/2001 | Djukastein et al. | 119/713 |
| 6,314,914 B1 * | 11/2001 | Betzen | 119/712 |
| 6,332,262 B1 | 12/2001 | Sakamoto | |
| 6,341,550 B1 * | 1/2002 | White | 87/5 |
| 6,371,054 B1 * | 4/2002 | Celata et al. | 119/712 |
| 6,457,283 B1 | 10/2002 | Jensen | |
| 6,472,602 B1 | 10/2002 | Pokrandt | |
| 6,477,027 B1 * | 11/2002 | McKelvy | 361/220 |
| 6,718,689 B1 * | 4/2004 | Kolibas | 43/131 |
| 6,718,701 B2 * | 4/2004 | Riddell | 52/101 |
| 6,775,950 B2 * | 8/2004 | Donoho | 52/101 |
| 6,834,846 B2 * | 12/2004 | Robbins, III | 256/10 |
| 6,878,883 B1 | 4/2005 | Rauckman | |
| 6,925,748 B2 * | 8/2005 | McGill et al. | 43/98 |
| 6,928,768 B1 * | 8/2005 | Snow | 43/98 |
| 6,933,446 B1 * | 8/2005 | Waldorf et al. | 174/117 F |
| 7,020,995 B1 * | 4/2006 | Snow | 43/98 |
| 7,036,278 B1 * | 5/2006 | Donoho | 52/101 |
| 7,075,015 B1 | 7/2006 | Rauckman | |
| 7,243,465 B2 * | 7/2007 | Donoho | 52/101 |
| 7,249,436 B2 * | 7/2007 | Ravenelle et al. | 43/98 |
| 7,276,665 B1 | 10/2007 | Rauckman | |
| 7,299,586 B2 | 11/2007 | Lawson, Jr. | |
| 7,351,913 B2 * | 4/2008 | Waldorf et al. | 174/117 F |
| 7,434,788 B2 | 10/2008 | Foster | |
| 7,481,021 B2 * | 1/2009 | Riddell | 43/98 |
| 7,596,910 B1 * | 10/2009 | Donoho | 52/101 |
| 7,679,000 B2 | 3/2010 | Rauckman | |
| 7,772,499 B2 | 8/2010 | Rauckman | |
| 7,802,396 B2 * | 9/2010 | Donoho | 43/98 |
| 7,802,405 B1 | 9/2010 | Donoho et al. | |
| 7,481,021 C1 | 5/2011 | Riddell | |
| 7,937,885 B2 | 5/2011 | Donoho | |
| 7,939,885 B2 | 5/2011 | Von Borcke et al. | |
| 7,941,977 B2 * | 5/2011 | Donoho | 52/101 |
| 8,015,747 B2 * | 9/2011 | Donoho | 43/98 |
| 8,020,340 B2 * | 9/2011 | Donoho | 43/98 |
| 8,065,842 B2 * | 11/2011 | Donoho et al. | 52/101 |
| D658,484 S * | 5/2012 | Wall | D8/354 |
| 8,191,303 B2 | 6/2012 | Donoho | |
| 8,196,340 B2 * | 6/2012 | Donoho | 43/98 |
| 8,196,341 B2 * | 6/2012 | Donoho | 43/98 |
| 8,276,324 B2 * | 10/2012 | Donoho | 52/101 |
| 8,286,385 B2 * | 10/2012 | Donoho | 43/98 |
| 8,293,044 B1 * | 10/2012 | Riddell | 156/71 |
| 2001/0015426 A1 | 8/2001 | Bellon | |
| 2001/0048053 A1 * | 12/2001 | Donoho | 248/68.1 |
| 2002/0066895 A1 | 6/2002 | Wildschut | 256/10 |
| 2002/0092481 A1 * | 7/2002 | Spooner | 119/908 |
| 2003/0172575 A1 | 9/2003 | Donoho | |
| 2003/0208967 A1 * | 11/2003 | Riddell | 52/101 |
| 2004/0173786 A1 | 9/2004 | Robbins, III | |
| 2004/0255837 A1 * | 12/2004 | Donoho | 116/22 A |
| 2005/0132635 A1 * | 6/2005 | Riddell | 43/98 |
| 2005/0150469 A1 * | 7/2005 | Wolfgram | 119/712 |
| 2006/0032111 A1 | 2/2006 | Willard et al. | |
| 2006/0144614 A1 | 7/2006 | Kiranski et al. | |
| 2006/0207195 A1 | 9/2006 | Donoho | |
| 2007/0180781 A1 * | 8/2007 | Donoho | 52/101 |
| 2007/0214710 A1 * | 9/2007 | Donoho | 43/98 |
| 2007/0220802 A1 * | 9/2007 | Donoho | 43/98 |
| 2008/0028668 A1 | 2/2008 | Pollman | |
| 2008/0029746 A1 * | 2/2008 | Creed et al. | 256/10 |
| 2008/0172817 A1 | 7/2008 | Riddell | |
| 2009/0126651 A1 * | 5/2009 | Riddell | 119/712 |
| 2009/0165281 A1 | 7/2009 | Larsen | |
| 2009/0249710 A1 * | 10/2009 | Donoho | 52/101 |
| 2009/0260272 A1 | 10/2009 | Donoho | |
| 2009/0261180 A1 | 10/2009 | Donoho et al. | |
| 2010/0180490 A1 * | 7/2010 | Donoho | 43/98 |
| 2010/0258970 A1 * | 10/2010 | Axelrod et al. | 264/173.11 |
| 2011/0038904 A1 * | 2/2011 | Matteliano et al. | 424/401 |
| 2011/0067646 A1 * | 3/2011 | Donoho | 119/713 |
| 2011/0146589 A1 | 6/2011 | Donoho | |
| 2011/0214339 A1 * | 9/2011 | Donoho | 43/112 |
| 2011/0214618 A1 * | 9/2011 | Donoho | 119/713 |
| 2011/0314724 A1 * | 12/2011 | Donoho | 43/98 |
| 2012/0030989 A1 * | 2/2012 | Donoho | 43/1 |
| 2012/0031016 A1 * | 2/2012 | Donoho | 52/101 |
| 2012/0151823 A1 | 6/2012 | Donoho et al. | |
| 2012/0224294 A1 * | 9/2012 | Donoho | 361/232 |
| 2012/0227334 A1 * | 9/2012 | Donoho | 52/101 |
| 2012/0241214 A1 * | 9/2012 | Donoho | 174/74 R |
| 2013/0042817 A1 | 2/2013 | Donoho | |

FOREIGN PATENT DOCUMENTS

| | | |
|---|---|---|
| CN | 102356699 A | 2/2012 |
| DE | 3930012 A1 | 3/1991 |
| DE | 4127774 A1 | 2/1993 |
| DE | 19544117 A1 | 5/1997 |
| DE | 20 2010 017 470 U1 | 2/2012 |
| EP | 0 592 054 A1 | 4/1994 |
| EP | 1205589 | 5/2002 |
| EP | 1 314 355 A2 | 5/2003 |
| EP | 1314355 A2 | 5/2003 |
| GB | 1 207 496 | 10/1970 |
| JP | 08256666 A | 10/1996 |
| JP | 11155463 A | 6/1999 |
| JP | 11289959 A | 10/1999 |
| JP | 11346634 A | 12/1999 |
| JP | 200032901 A | 2/2000 |
| JP | 200200163 | 1/2002 |
| JP | 2002017235 A | 1/2002 |
| JP | 2002119193 A | 4/2002 |
| JP | 2003219788 | 8/2003 |
| JP | 2006340691 A | 12/2006 |
| JP | 2007000142 A | 1/2007 |
| WO | WO-84/04022 | 10/1984 |
| WO | WO-9320689 | 10/1993 |
| WO | WO-95/08915 | 4/1995 |
| WO | WO 96/08140 | 3/1996 |
| WO | WO-2004021780 A1 | 3/2004 |
| WO | WO-2005/055865 A2 | 6/2005 |
| WO | WO-2005/055865 A3 | 6/2005 |

| | | |
|---|---|---|
| WO | WO-2009/129412 A1 | 10/2009 |
| WO | WO-2010/083516 A1 | 7/2010 |
| WO | WO2012/040009 A2 | 3/2012 |

OTHER PUBLICATIONS

Bird Barrier America, Inc., pp. 24-25 of its 2001 Catalog, published in the United States.

Bird Barrier America, Inc., undated one-page Flyer for its "Bird Shock V2" device published in the United States.

Shock Strips™ D&S Specialty Products, Inc., Kirkland, WA, ShockStrip product description—last visited Jun. 26, 2012, http://www.flybye.com/shockstrip.pdf.

Fly-Bye Bird Control Products—www.flybye.com catalog product info.pdf—ShockStrip, last visited Jun. 26, 2012, http://www.flybye.com/catalog/product_info.php?cPath=2&products_id=203&osCsid=aid88q0883dsg228ieeip67fg5.

Fly-Bye-Bird-Control Products—www.flybye.com catalog product info.pdf—ShockStrip, enlarged picture last visited Jun. 26, 2012, http://www.flybye.com/catalog/product_info.php?cPath=2&products_id=203&osCsid=ajd88q0883dsg228ieeip67fg5.

Photograph of Cross Sectional View of deterrent device; first public use or sale unknown; manufacturer unknown.

Photograph of Bottom View of deterrent device; first public use or sale unknown; manufacturer unknown.

Photograph of Top View of deterrent device; first public use or sale unknown; manufacturer unknown.

Photograph of Perspective View of deterrent device; first public use or sale unknown; manufacturer unknown.

* cited by examiner

ANIMAL DETERRENT DEVICE WITH INSULATED FASTENERS

CROSS-REFERENCE TO RELATED APPLICATION

This application is a continuation of co-pending U.S. application Ser. No. 13/533,846, filed Jun. 26, 2012, the entirety of which is incorporated herein by reference.

FIELD

This patent document relates in general to an animal deterrent device that delivers an electric shock to animals or pests that come into contact with it. In particular, this patent document pertains to such devices that are adapted for use as bird deterrent devices.

BACKGROUND

Electricity was first put to commercial and residential use in the United States in the late 1800's, to solve the age-old problem of darkness. Ever since, the ability of electrical current to deliver an electric shock to a person or animal has been recognized. Shortly thereafter, the non-lethal applications of electricity for use in encouraging the behavior of animals was commercially implemented. The electric cattle prod is perhaps the best known of those devices. Today, however, electricity is used in many ways with animals. As just a few examples, electric fences are used to keep farm animals in and predators out, and dog trainers use electrical stimulus in dog collars to assist with dog training.

An age-old problem that has been perplexing mankind since long before the discovery and harnessing of electricity is the propensity of pests in general, but particularly birds, to land in areas where their human neighbors would prefer they did not. An incredible array of devices have been used to dissuade birds from landing or roosting in areas undesirable to humans. Metallic spikes, coil or rotating devices, sound-emitting devices, imitation predators, and even real predators, are just a few examples of bird deterrent devices that have been used.

At some point in the evolution of bird deterrent devices lethal and non-lethal electrical shock began to be employed as a bird deterrent. One device of this type is shown in U.S. Pat. No. 4,299,048. In one embodiment, a pair of copper wires connected to a power source are embedded in opposite sides of a cable of appropriate diameter such that when the birds of choice (in this case, starlings) land on the cable, their feet touch both wires, closing the circuit and thereby delivering a lethal shock to the birds.

U.S. Pat. No. 6,283,064 discloses another version of a bird and pest deterrent device in which a pair of crimped copper wires are appropriately spaced apart so that the bird's or other pest's feet will touch both wires, resulting in a short circuit and delivering a shock to the bird or other pest.

Other devices for carrying electric charges for discouraging birds and other pests are described in U.S. Pat. Nos. 3,294,893; 3,366,854; 3,717,802; 4,299,048; and 5,850,808. A common idea to all of these devices is the concept of appropriately spaced-apart electrical contacts which will both be connected by the bird's (or other pest's) feet (or other part of their anatomy) so as to deliver the appropriate electric shock.

U.S. Pat. No. 7,481,021 to Riddell uses a flexible track and replaces the typically-used wire with a braided conductive element that may be sewn to the base. This configuration helps alleviate the problem of the wire separating from its base when the track is bent to fit certain surfaces.

Some other devices and methods are disclosed, for example, in the following: U.S. Pat. Nos. 8,015,747; 8,020,340; and international applications WO 95/08915; and WO/2012/040009.

While all of these devices work at least initially to a degree in some installations, the designs of the current systems exhibit problems. One problem is the unwanted shorting of the conductive wires due to an accumulation of water beneath the track or base. For example, the stitching used to secure the metal braids or metal mesh to flexible polyvinyl chloride ("PVC") extrusions can create problems with respect to arcing to some surface materials. Occasionally, the sewing machine's needle breaks a wire strand and pushes it through the bottom of the base. When the wire is electrified these strands can arc with a wet or metal surface below. In addition, water that pools underneath the track can be absorbed by the thread used to sew the conductive wire to the base, creating a conductor and causing an arc to the surface below. Raising the stitch off the surface by means of a groove does not eliminate this problem.

While the existing animal deterrents are useful to a degree, they still suffer from certain drawbacks that may cause undesired short circuiting of the device. Therefore, there exists a need in the art for an improved electrical shock deterrent device that solves or at least alleviates some or all of these problems.

SUMMARY OF THE EMBODIMENTS

Systems and methods for deterring animals by using electrical animal deterrent devices and systems and methods of installing and manufacturing such animal deterrent devices are disclosed and claimed herein.

As described more fully below, the apparatus and processes of the embodiments disclosed permit improved systems and methods for deterring animals by using electrical animal deterrent devices and systems and methods of installing and manufacturing such animal deterrent devices. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed embodiments.

To this end, an animal deterrent device is provided, the animal deterrent device comprising an elongated base having a cross section including a top layer with a top surface and a bottom surface, and a bottom layer; a first conductive element extending perpendicular to the cross section along the top surface of the top layer; and a first fastener that couples the first conductive element to the top surface at a first connection point and extends from the first conductive element through the top layer to a second connection point on the bottom surface of the top layer; wherein the bottom layer insulates the first fastener at the second connection point from an exterior.

In another embodiment, the bottom layer is coupled to the top layer enclosing a gap. In yet another embodiment, the cross section of the elongated base has a slit that extends from an exterior to the gap. In another embodiment, the slit is positioned such that it creates a flap in the top layer or the bottom layer, wherein the flap covers at least a portion of the gap. In some embodiments, the flap is sufficiently flexible to allow it to be folded to obtain access to a bottom surface of the top layer from an exterior.

In certain embodiments, the animal deterrent device further comprises a second conductive element coupled to the top surface of the top layer and extending parallel to the first conductive element. In another embodiment, an adhesive is disposed on a portion of the first fastener that extends into the gap. In yet another embodiment, the first conductive element is sewn to the elongated base. In another embodiment, the first fastener extends from the first conductive element through the top layer and through the bottom layer.

In some embodiments, the cross section includes a center divider connecting the top layer and the bottom layer and is located substantially in a center of the elongated base and extending substantially perpendicular to the top layer. In another embodiment, the bottom layer is coupled to the top layer by the center divider. In yet another embodiment, the first conductive element and the second conductive element are attachable respectively to the positive and negative terminals of a power source. In another embodiment, the thickness of the bottom layer increases proximate to the slit.

In some embodiments, the animal deterrent device further comprises an anchor protruding down from the bottom surface of the top layer. In another embodiment, a portion of the anchor proximate to its bottom is thicker than a portion of the anchor further from its bottom.

In another embodiment, the anchor is an inverted T shape. In yet another embodiment, the anchor and the bottom layer are sealed with an adhesive. In another embodiment, further comprising an anchor protruding down from the bottom surface of the top layer, the thickness of the gap tapers down proximate to the anchor.

In another embodiment, the first fastener extends through the bottom layer to a third connection point on the bottom surface of the bottom layer.

In certain embodiments, the first conductive element is made of metal. In another embodiment, the first conductive element further comprises a braided wire. In yet another embodiment, the braided wire comprises some strands of a conductive material and other strands of a non-conductive material. In another embodiment, a gap at an end of the elongated base is sealed off from an exterior.

In some embodiments, the animal deterrent device further comprises an arc suppressor disposed between the first conductive element and the second conductive element. In another embodiment, the thickness of the top layer decreases proximate to the first fastener. In yet another embodiment, a surface area of the bottom surface of the bottom layer is increased over a substantial portion of the bottom surface of the bottom layer.

In one form, the present disclosure provides an animal deterrent device, comprising a first non-conductive piece having a top side and a bottom side a conductive element coupled to the first non-conductive piece with a first fastener that extends from the non-conductive piece to the bottom side; and a second non-conductive piece coupled to the first non-conductive piece wherein the second non-conductive piece covers the first fastener and insulates the first fastener from an exterior.

In certain embodiments, the first non conductive piece is coupled to the second non-conductive piece by an adhesive. In another embodiment, the second non-conductive piece is coupled to the first non-conductive piece by interlocking. In yet another embodiment, the first nonconductive piece and the second non conductive piece comprise an interlocking shape; and wherein the interlocking shape is selected from the group of a T-shape, a stemmed inverted V-shape, a stemmed inverted U-shape, a stemmed circular shape, and an arrowhead shape.

In one form, the present disclosure provides an animal deterrent device, comprising an elongated base having a hollow interior space forming a top inside surface and a bottom inside surface; a first conductive element coupled to an outside of the elongated base by a first fastener that extends through to the top inside surface; and a second conductive element coupled to an outside of the elongated base by a second fastener that extends through to the top inside surface.

In another embodiment, the elongated base has a slit that extends from the outside of the elongated base to the hollow interior space.

In one form, the present disclosure provides a method of installing an animal deterrent device, comprising the steps of applying an adhesive between a bottom layer of the animal deterrent device and an external surface; and pressing the animal deterrent device towards the external surface such that an anchor of the animal deterrent device is pressed into the adhesive; wherein the animal deterrent device comprises an elongated base having a cross section including a top layer with a top surface and a bottom surface, and the bottom layer, a first conductive element extending perpendicular to the cross section along the top surface of the top layer, a first fastener that couples the first conductive element to the top surface at a first connection point and extends from the first conductive element through the top layer to a second connection point on the bottom surface of the top layer, and the anchor protruding down from the bottom surface of the top layer, wherein the bottom layer insulates the first fastener at the second connection point from an exterior.

In some embodiments, the pressing step further comprises pressing the animal deterrent device towards the external surface such that the adhesive pushes a flap on a side of the anchor upwards as the animal deterrent device is pressed into the adhesive. In another embodiment, the adhesive enters a space between the anchor and the flap as the animal deterrent device is pressed towards the external surface. In another embodiment, the adhesive is squeezed in a direction away from the anchor during the pressing step. In yet another embodiment, a portion of the anchor proximate to its bottom is thicker than a portion of the anchor further from its bottom. In certain embodiments, the anchor is an inverted T shape. In another embodiment, the anchor further comprises a ridge wherein the adhesive is disposed on a top surface of the ridge after the pressing step. In yet another embodiment, the first conductive element and a second conductive element coupled to the top surface of the top layer are attachable respectively to the positive and negative terminals of a power source.

In one form, the present disclosure provides a method of installing an animal deterrent device, comprising the steps of applying an adhesive between a bottom layer of the animal deterrent device and an external surface; and pressing the animal deterrent device towards the external surface such that an anchor of the animal deterrent device is pressed into the adhesive; wherein the animal deterrent device comprises an elongated base having a hollow interior space forming a top inside surface and a bottom inside surface, a first conductive element coupled to an outside of the elongated base by a first fastener that extends through to the top inside surface, a second conductive element coupled to an outside of the elongated base by a second fastener that extends through to the top inside surface, and the anchor protruding down from the top inside surface.

In one form, the present disclosure provides a process for producing an animal deterrent device, the process comprising the steps of forming an elongated base having a cross section including a top layer with a top surface and a bottom surface, and a bottom layer; cutting the elongated base to create a first slit, where the first slit is positioned such that it creates a flap; folding the flap to obtain access to the bottom side of the top layer; and fastening a first conductive element to the top side of the top layer with a first fastener, such that the first fastener extends from the first conductive element to the bottom side of the top layer.

In another embodiment, the process further comprises the step of sealing the first slit. In another embodiment, the first slit is sealed with an adhesive. In yet another embodiment, the cutting step is performed by a first blade creating the first slit; and a second blade creating a second slit. In another embodiment, the first slit and the second slit are made at the same time. In yet another embodiment, the first blade is parallel to the second blade. In another embodiment, the first blade and the second blade are angled towards each other.

In some embodiments, the forming step is performed by extruding the elongated base. In another embodiment, the first slit is cut in the bottom layer. In another embodiment, the first slit is cut in the top layer.

In one form, the present disclosure provides a process for producing an animal deterrent device, the process comprising the steps of forming a top layer of an elongated base, wherein the top layer has a bottom side and a top side; forming a bottom layer of an elongated base; fastening a first conductive element to the top side of the top layer with a first fastener at a first connection point, such that the first fastener extends from the first conductive element to a second connection point on the bottom side of the top layer; and coupling the bottom layer to the bottom side of the top layer. In another embodiment, the bottom layer insulates the first fastener at the second connection point from an exterior. In yet another embodiment, the bottom layer is coupled to the top layer by an adhesive. In another embodiment, the bottom layer is coupled to the top layer by stitching. In some embodiments, the forming steps are performed by extrusion.

These and other objects, features, aspects, and advantages of the present patent document will become better understood with reference to the following description and accompanying drawings.

DETAILED DESCRIPTION OF THE EMBODIMENTS

Reference will now be made to the drawings in which the various elements of the present disclosure will be given numerical designations and in which the present disclosure will be discussed so as to enable one skilled in the art to make and use the present disclosure. It is to be understood that the following description is only exemplary of the principles of the present disclosure, and should not be viewed as narrowing the claims. Additionally, it should be appreciated that the components of the individual embodiments discussed may be selectively combined in accordance with the teachings of the present disclosure. Furthermore, it should be appreciated that various embodiments will accomplish different objects of the present disclosure, and that some embodiments falling within the scope of the present disclosure may not accomplish all of the advantages or objects which other embodiments may achieve.

Figure 1:
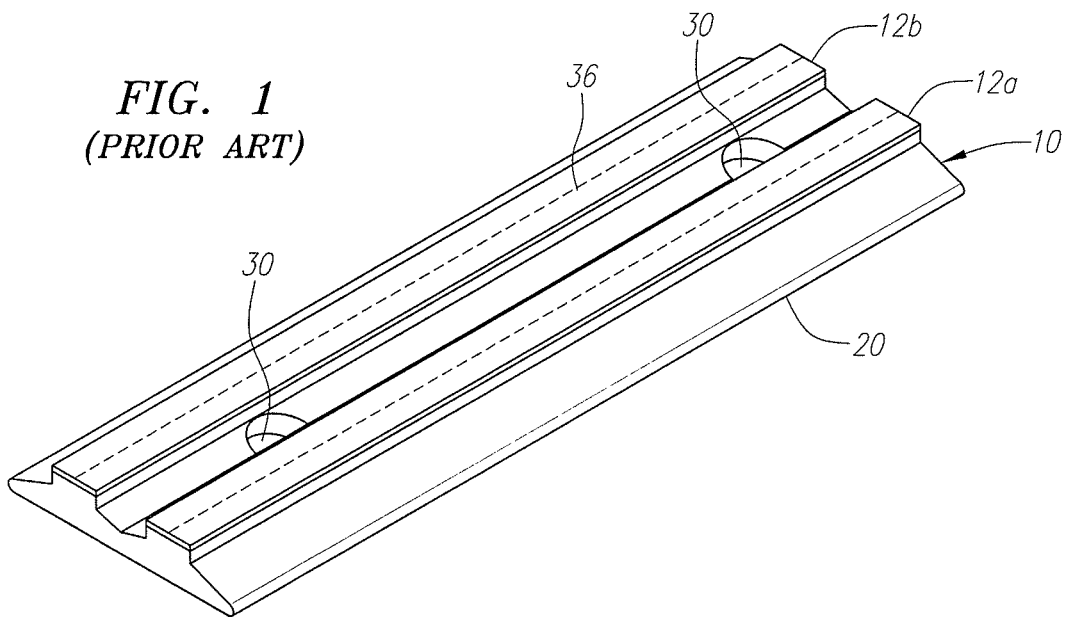
FIG. 1 illustrates a perspective view of an electric deterrent device in accordance with the principles of existing designs.

Referring to FIG. 1, there is shown a perspective view of an electric deterrent device in accordance with the principles of existing designs. The base 10 has a flat lower surface 20 that is presented for attachment to the surface of the location from which the pests or birds are to be deterred. The cross-sectional shape of the base 10 is essentially co joined pedestals that each present an elevated section and each having and upper flat surface to which the braided elements 12a and 12b are attached. A central gap exists between the two elevated sections, and is useful to provide for water run-off to prevent accidental short circuiting of the device in the presence of water which may accumulate due to rain or irrigation. Holes 30 are placed through the base 10 at regular intervals along the entire length of the base to facilitate attachment of the device to the perch location (not shown). There is a single line of stitching 36 down the longitudinal center of each braided element 12a and 12b.

Figure 2:
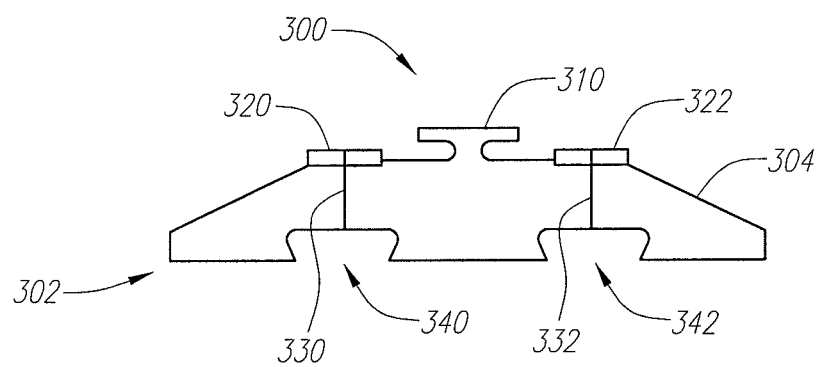
FIG. 2 illustrates a cross-sectional view of an animal deterring device in accordance with the principles of existing designs.

Referring to FIG. 2, there is shown a cross-sectional view of an animal deterring device in accordance with the principles of existing designs. The device 300 has an elongated carrier 302, to which conductive traces 320 and 322 can be coupled using any commercially suitable fastener. Each of the conductive traces 320 and 322 are coupled to carrier 302 by threads 330 and 332, respectively. The traces 320 and 322 may be coupled to the carrier 302 on a horizontal surface or an angled surface 304, and are disposed over glue troughs 340 and 342, respectively. The first trace 320 is coupled to the carrier 302 by a thread 330 that extends from the first trace 320 to the first glue trough 340 to form first and second seams, and the second trace 322 is coupled to the carrier 302 by a thread 332 that extends from the second trace 322 to the second glue trough 342 to form third and fourth seams. The traces 320 and 322 can be separated by an arc suppressor 310.

Figure 3:
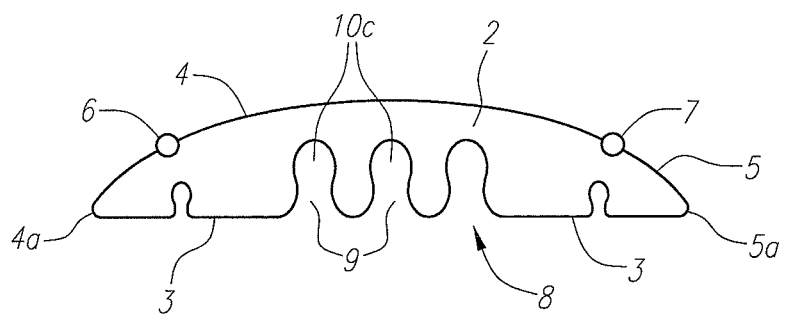
FIG. 3 illustrates a cross-sectional view of a deterrent arrangement in accordance with the principles of existing designs.

Referring to FIG. 3, there is shown a cross-sectional view of a deterrent arrangement in accordance with the principles of existing designs. The base 3 of the body portion is provided with a plurality of indentations or slots 8, which are longitudinally extending along the length of the elongate body portion 2. The indentations or slots 8 are provided with a restricted mouth or entry portion 9, which leads into an enlarged main portion 10c of the indentations 8. The laterally spaced apart elongate lengths of live wire 6, and earth wire 7, are moulded into or attached to, the opposing sloping sides 4 and 5 of the body portion 2, the body portion 2 is provided with angled sloping sides 4, 5, with the lengths of live wire 6 and earth wire 7 being provided on the sides thereof, adjacent to but spaced apart from lower ends 4a, 5a thereof.

Figure 4:
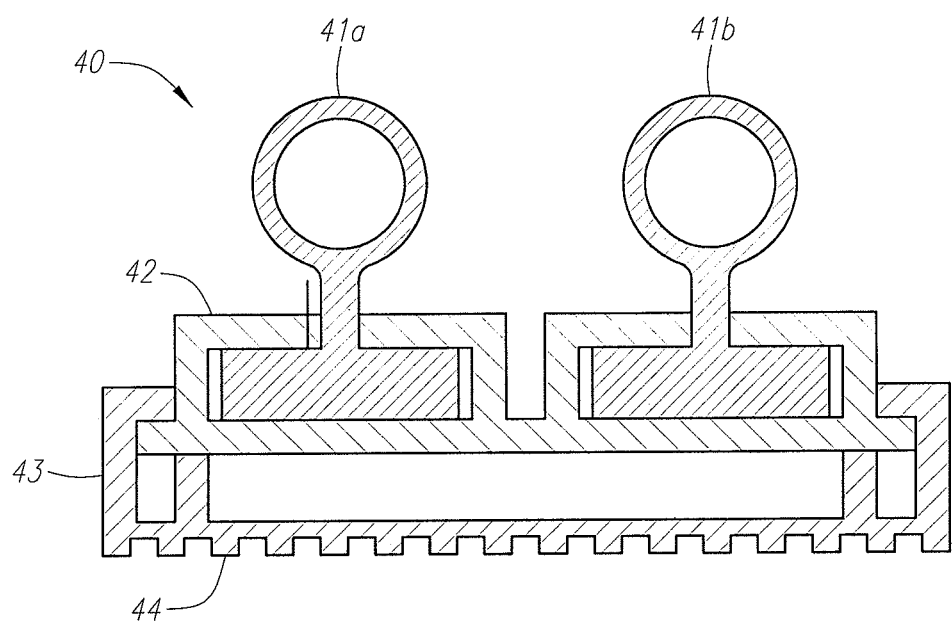
FIG. 4 illustrates a cross-sectional view of a deterrent device in accordance with the principles of existing designs.

Referring now to FIG. 4, there is shown a cross-sectional view of a deterrent device in accordance with the principles of existing designs. The deterrent device 40 has an elongated carrier made of an upper base portion 42, and a lower base portion 43. Conductors 41a and 41b slide into slots in the upper base portion 42. The lower base portion 43 slides onto the upper base portion 42. The lower base portion 43 has a corrugated bottom 44.

In accordance with the present disclosure, improved animal deterrent devices and methods are disclosed which address, or at least ameliorate one or more of the problems of existing designs. The improved animal deterrent devices of the present disclosure are an improvement over existing designs at least because they insulate a fastener from rain or water that may pool underneath the bottom of the device.

Figure 5:
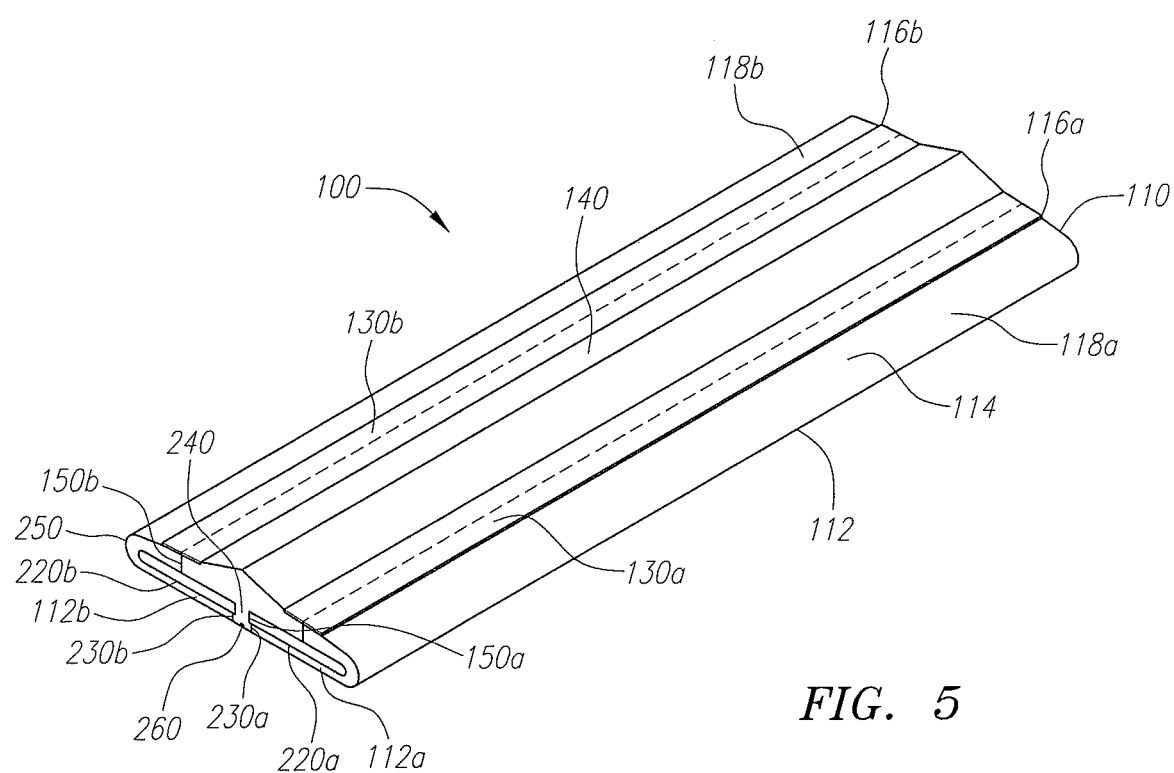
FIG. 5 illustrates a perspective view of one preferred embodiment of the present patent document.

FIG. 5 illustrates a perspective view of a preferred embodiment of the present patent document. In a preferred embodiment, the animal deterrent device includes an elongated base 110 and a pair of conductive elements 130a and 130b attached thereto. In various embodiments, the elongated base 110 may be a variety of different shapes. It should be understood that only those specific elements of the shape of the elongated base 110 described in the claims limit the embodiments claimed.

The elongated base 110 comprises a bottom layer 112 that may be attached to the exterior surface of the location from which the pests or birds are to be deterred. The elongated base 110 comprises a top layer 114. In some embodiments the top layer 114 includes horizontal or angled surfaces 116a and 116b where the conductive elements 130a and 130b are coupled to the elongated base 110. In the embodiment shown in FIG. 5, the conductive elements 130a and 130b are separated by an arc suppressor 140. In this embodiment, the shape of the elongated base is an elongated extrusion with a substantially flat top layer 114 and bottom layer 112, but any shape of the elongated base 110 may be used. The conductive elements 130a and 130b are shown to be rectangular shapes, but round or other shapes may be used as well. The elongated base 110 may also be referred to herein as a base, as an elongated extrusion, or as an extrusion. In other embodiments, the elongated base 110 may either be made from a conductive element, or contain a conductive element. The animal deterrent device may be attached to the surface of the location from which the pests or birds are to be deterred by many different methods, including but not limited to staples, adhesive, nails, pins, tacs, adhesive, screws, nuts and bolts, or a combination thereof, as well as many others. In a preferred embodiment, glue is applied along the center of the bottom of elongated base 110 as a strip or bead in the axial direction. In another embodiment, the glue is applied intermittently along the center of the bottom of the elongated base 110. The device may have angled or sloped portions on its top layer 114 so that in the case of rain or water or other liquid, the liquid will run away down the sloping sides, and will not collect on or about the conductive elements. The elongated base 110 may be made by extrusion, casting thermoforming, molding, or by any other method.

In FIG. 5, the dotted line extending down the middle of the conductive elements 130a and 130b represents the fasteners 150a and 150b such as a stitch or staple. Generally speaking, any fastener may be used to couple the conductive elements 130a and 130b to the elongated base 110. In a preferred embodiment, a stitch or staple is used as a fastener. In other embodiments, other fasteners may include nails, pins, tacs, adhesive, screws and nuts and bolts to name a few.

The animal deterrent device 100 has an elongated base 110 that has a cross section including a top layer 114 with a top surface and a bottom surface, and a bottom layer 112. A first conductive element 130a extends perpendicular to the cross section along the top surface of the top layer 114, and a first fastener 150a that couples the first conductive element 130a to the top surface at a first connection point and extends from the first conductive element 130a through the top layer to a second connection point on the bottom surface of the top layer 114, wherein the bottom layer 112 insulates the first fastener 150a at the second connection point from an exterior (not shown). The top layer 114 has a top surface and a bottom surface. The top surface of the top layer 114 may be referred to as a top side. The bottom surface of the top layer 114 may be referred to as a bottom side. The bottom layer 112 has a top surface and a bottom surface. The top surface of the bottom layer 112 may also be referred to as a top side. The bottom surface of the bottom layer 112 may also be referred to as a bottom side.

Figure 6:
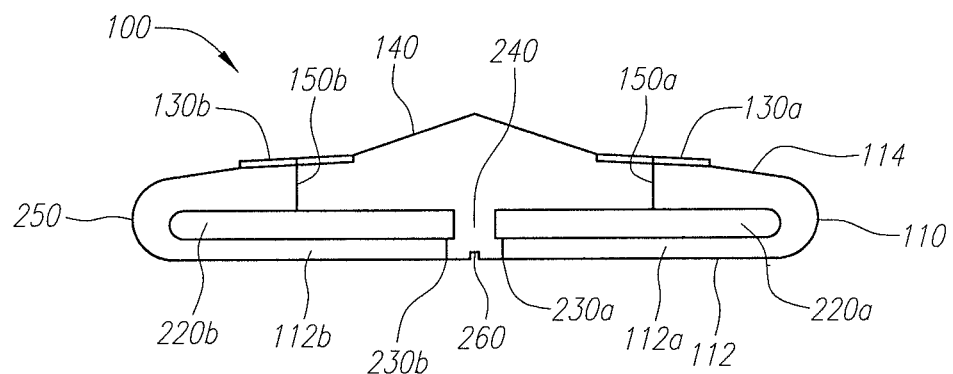
FIG. 6 illustrates a vertical cross sectional view of one embodiment of the preferred animal deterrent device of FIG. 5.

FIG. 6 illustrates a vertical cross sectional view of one embodiment of the preferred animal deterrent device 100 of FIG. 5. In a preferred embodiment of the animal deterrent device, the conductive elements 130a and 130b are braided, such as the braided elements described in U.S. Pat. No. 7,481,021 to Riddell, but they may also be knitted, mesh, interlocking loops, or other configurations. In some embodiments, the first conductive element may comprise a braided wire, wherein the braided wire comprises some strands of a conductive material and other strands of a non-conductive material. The conductive elements 130a and 130b are coupled to the elongated base 110 with fasteners 150a and 150b. In a preferred embodiment, the fastener may be a stitch or series of stitches that couple the conductive elements 130a and 130b to the elongated base 110. This type of coupling may be referred to as sewing. The conductive element 130a may be referred to as the first conductive element, and the conductive element 130b may be referred to as the second conductive element. The fastener 150a may be referred to as a first fastener, and the fastener 150b may be referred to as a second fastener. In some embodiments, the first conductive element may further comprise a braided wire. In some embodiments, such as in ones comprising a braided wire, the wire strands that comprise the conductive element may be comprised of some strands of a conductive material and other strands of a non-conductive material.

The elongated base 110 includes gaps 220a and 220b. The gaps 220a and 220b may also be called hollow interior spaces. In one method of manufacturing the elongated base 110, gaps 220a and 220b are created below the conductive elements 130a and 130b during the formation process. In one embodiment, the elongated base 110 is made by extrusion. In the embodiment shown in FIG. 5, slits 230a and 230b are cut into the bottom layer 112, creating flaps 112a and 112b. In this embodiment, the slits 230a and 230b extend from an exterior through the bottom layer 112 into the gaps 220a and 220b. The flaps 112a and 112b serve to separate or insulate the fasteners 150a and 150b from an exterior. An exterior may be anything that is not part of the animal deterrent device 100. The exterior may include any exterior surface that the base 110 of the animal deterrent device 100 may be attached to.

Slits 230a and 230b allow the bottom layer 112 of the elongated base 110 to fold outward away from the gaps 220a and 220b exposing the inside of the elongated base 110 and the bottom side of the top layer 114. The slits 230a and 230b may be made at any locations of the elongated base 110, including the bottom layer, the top layer, or the sides or edges. In different embodiments different numbers of slits may be used. A slit may be a gap of any width. A gap may also be any size, even as thin as a slit. A slit may be any shape. A gap may also be any shape. In one embodiment, the gaps 220a and 220b in an end of the elongated base 110 may be sealed off from the exterior. The gaps may be sealed by any means, including, but not limited to, by gluing, clamping, heat-melting, or any method that prevents water or other material that could undesirably short circuit the animal deterrent device from entering the gaps.

Figure 7:
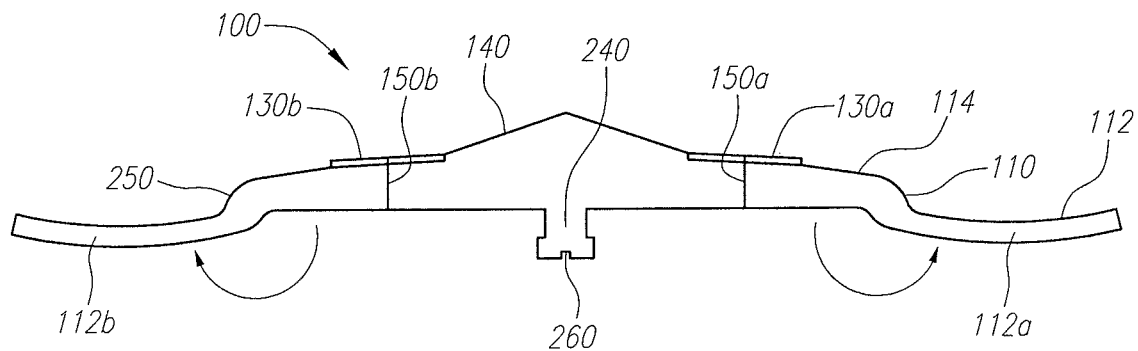
FIG. 7 illustrates a vertical cross sectional view of one embodiment of the preferred animal deterrent device of FIG. 5 with pieces of the bottom layer folded outward.

FIG. 7 illustrates a cross section of one embodiment of the animal deterrent device 100 with portions of the bottom layer 112 in a bent position. In the embodiment shown in FIG. 7, the edges of the gaps 220a and 220b are made of a material flexible enough to allow a portion of the bottom layer 112 to be bent outward enough to expose the inside of the top layer 114 of the elongated base 110. The portions of the bottom layer 112 of the elongated base 110 that are bent outward in FIG. 7 are flaps 112a and 112b.

In a preferred embodiment, it is desirable to fold a portion of the bottom layer 112 away from the gap so that the conductive element may be fastened to the top layer 114 more easily. Folding the bottom layer 112 away from the gap may also prevent the fasteners 150a and 150b from accidentally being coupled to the bottom layer 112 when coupling the conductive element to the top layer 114.

In a preferred process for coupling the conductive elements 130a and 130b to the animal deterrent device 100, the bottom layer 112 is unfolded outward to allow the conductive elements 130a and 130b to be fastened to the top layer 114 of the elongated base 110, while preventing the fasteners 150a and 150b from penetrating the bottom layer 112 of the elongated base 110. The flaps 112a and 112b may then be folded back into place after the conductive elements 130a and 130b are attached, insulating the fasteners 150a and 150b from the exterior. In a preferred embodiment, the bottom layer 112 provides insulation for the fasteners 150a and 150b that may penetrate through the bottom side of the top layer 114 by preventing rain, water, other liquid, animal waste (such as bird excrement), or other material that may pool underneath the elongated base 110 from traveling through any holes made in the top layer 114 during fastening or being absorbed by the fasteners 150a and 150b, thereby preventing an undesired short circuit in the animal deterrent device 100. The bottom layer 112 also provides insulation for conductive elements 130a and 130b that may have been pushed through the top layer 114 in the fastening process, such as by a needle pushing a portion of a conductor through the bottom surface of the top layer 114. In some embodiments, after the conductive elements 130a and 130b have been attached, the flaps 112a and 112b may subsequently be secured back into place with an adhesive such as glue, thereby further insulating any portion of the fasteners 150a and 150b that pushed through the top layer 114 of the elongated base 110 from the exterior, and thus preventing arcing to the exterior surface below. In a preferred embodiment, it may be desirable to have the adhesive act as an additional insulator for the fasteners 150a and 150b against an exterior environment. In other embodiments, the flaps 112a and 112b may be secured by other methods, including, but not limited to, screws, bolts, staples, nails, or any other method as long as the flaps 112a and 112b insulate the connection points of the fasteners 150a and 150b from an exterior.

During one embodiment of the manufacturing process, a portion of the bottom layer 112 that is folded away from the gap may be held in place in the configuration of FIG. 7 either by an operator or by some mechanical device or other means. While the flaps 112a and 112b are folded away, the conductive elements 130a and 130b are coupled to the elongated base 110 with fasteners 150a and 150b. As a result, in this embodiment, the fasteners 150a and 150b just extend through the top layer 114.

In some embodiments, an adhesive or glue may be applied to an area inside the gaps 220a and 220b. In one embodiment, the adhesive applied inside the gap further insulates the fasteners 150a and 150b so that when the portion of the elongated base 110 that was folded away during manufacturing is released and retakes its former position at the bottom layer 112 of the elongated base 110, the fasteners 150a and 150b are then insulated by both the adhesive and the bottom of the elongated base 110 from the exterior. In some embodiments, only a portion of the gap is filled with adhesive while in other embodiments the entire gap may be filled or substantially filled. In another embodiment, the adhesive may be applied to the portion of the fasteners 150a and 150b that protrude into the gap.

In certain embodiments, the elongated base 110 may include cavities, grooves, or holes, to help in mounting the animal deterrent device 100 to the desired surface. These cavities, grooves, or holes may be filled with an adhesive such as glue. In yet other embodiments, the elongated base 110 may be mechanically attached to a desired surface. In such embodiments, attachment may be facilitated by screws, bolts, staples, nails, or any mechanical fastener. In some embodiments both adhesives and mechanical fasteners 150a and 150b may be used to attach the elongated base 110 to a desired surface. In certain embodiments, a center point reference mark 260 may be included in the elongated base 110. In other embodiments, no center point reference mark may be used.

The dimensions of a preferred embodiment will now be recited. These dimensions represent the dimensions of one preferred embodiment by way of example, and other embodiments may have other dimensions. In a preferred embodiment, the elongated base 110 is approximately 1.5 inches wide and approximately 0.35 inches high (from the bottom layer 112 to the top layer 114 of the arc suppressor 140). The width of each of the areas of the surfaces 116a and 116b adjacent to the arc suppressor 140 where the conductive elements 130a and 130b are attached to is approximately 0.23 inches. The width of the areas of the angled surfaces 118a and 118b that extend from the outer edges of the surfaces 116a and 116b to the edge of the elongated base 110 is 0.25 inches. The width of the arc suppressor 140 is 0.54 inches. The distance between the longitudinal centerline of the arc suppressor 140 and the adjacent edge of the surfaces 116a and 116b is 0.27 inches. The height of the arc suppressor 140 is 0.112 inches. The thickness of the top layer 114 is 0.118 inches, and the thickness of the bottom layer 112 is 0.055 inches. The vertical thickness of the gaps 220a and 220b is 0.065 inches. The center divider 240 has a width of 0.115 inches. The width of the gaps 220a and 220b from the edge of the center divider 240 to the edge of each gap is 0.6 inches. The height of the gaps 220a and 220b is 0.065 inches. The radial thickness of the edge 250 is 0.095 inches. The center point reference mark 260 has a height of 0.020 inches and a width of 0.020 inches.

These dimensions are by way of illustration only. The dimensions may be varied in any fashion as appropriate to the application. As just one example, the dimensions may be varied to accommodate different size birds or other pests. Also, the length of the animal deterrent device 100 segment as illustrated is relatively short. However, the elongated base 110 may be constructed in any length, and is preferably constructed in as long a length as feasible so as to avoid interconnecting segments of the animal deterrent device 100. For example, in one embodiment, the animal deterrent device 100 may be 50 feet long. However, inter-connecting segments of the animal deterrent device to form an elongated base of greater length than any individual segment may be used as well. In a preferred embodiment, the animal deterrent device 100 may be curved without harming its performance or life-expectancy. Accordingly, it may be rolled for shipment and storage, thus allowing for much longer single-formed pieces.

The animal deterrent device may include a center divider 240. The center divider 240 helps to prevent unwanted short circuiting, particularly in some embodiments where the axial ends of the animal deterrent device are left open or where water or other material that may cause a short circuit enters a gap. In other embodiments, a divider may be in other locations besides the center of the cross section, provided that it separates the first fastener 150a from the second fastener 150b. In other embodiments, no center divider 240 may be included, resulting in a single gap 222 as shown, for example, in FIG. 8 below.

Figure 8:
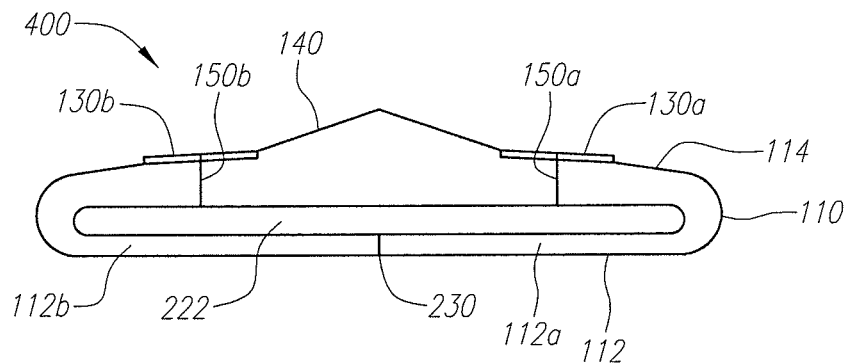
FIG. 8 illustrates a vertical cross sectional view of an alternative embodiment of an animal deterrent device of the present patent document without a center divider.

FIG. 8 illustrates a vertical cross sectional view of an alternative embodiment of an animal deterrent device of the present patent document. In the embodiment of animal deterrent device 400 shown in FIG. 8, the elongated base 110 comprises a bottom layer 112 that may be attached to the surface of the location from which the pests or birds are to be deterred. The elongated base 110 further comprises a top layer 114. The conductive elements 130a and 130b are coupled to the top layer 114, and are preferably separated by an arc suppressor 140. In the embodiment shown in FIG. 8, a slit 230 is substantially in the center of the bottom layer 112 between the two conductive elements 130a and 130b. Gap 222 is disposed between the top layer 114 and the bottom layer 112. In this embodiment, the slit 230 extends from an exterior through the bottom layer 112 into the gap 222. As also shown in FIG. 8, the gap 222 may be a single gap between the top layer 114 and the bottom layer 112. This differs from the embodiment shown in FIG. 5 in which a plurality of gaps 220a and 220b are used to separate the top layer 114 and the bottom layer 112. In other embodiments more gaps may be used. For example, some embodiments may include three or four or more gaps between the top layer 114 and the bottom layer 112. The gap 222 may also be called a hollow interior space. In one embodiment, the gap 222 in an end of the elongated base 110 may be sealed off from the exterior. The gap 222 may be sealed by any means, including, but not limited to, gluing, clamping, heat-melting, or any method that prevents water from entering the gap 222.

Figure 9:
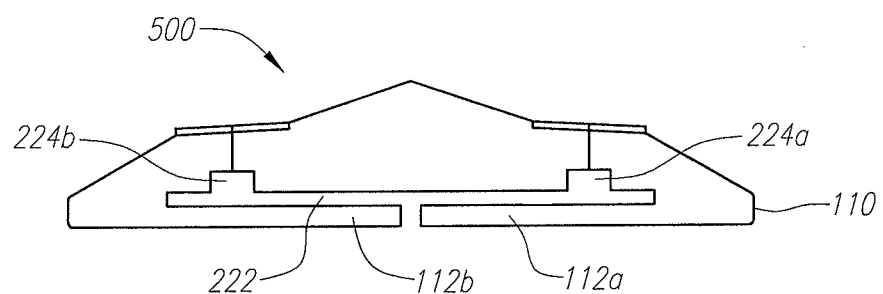
FIG. 9 illustrates a vertical cross sectional view of an alternative embodiment of an animal deterrent device of the present patent document with gap extensions.

FIG. 9 illustrates a vertical cross sectional view of another embodiment of an animal deterrent device of the present patent document. The embodiment of animal deterrent device 500 shown in FIG. 9 is similar to the embodiment shown in FIG. 8 except the embodiment shown in FIG. 9 further includes gap extensions 224a and 224b. Gap extensions 224a and 224b increase the distance between the inside surface of the top layer 114 and the bottom layer 112 directly below the conductive elements 130a and 130b. The thickness of the top layer decreases proximate to the fasteners 150a and 150b. Gap extensions 224a and 224b may also reduce the distance between the conductive elements 130a and 130b and the inside surface of the top layer 114, thus allowing a shorter fastener 150a and 150b. Shorter fasteners 150a and 150b may make fastening of the conductive elements 130a and 130b to the elongated base 110 easier. In one embodiment, where the fasteners 150a and 150b are thread that sews the conductive elements 130a and 130b to the top surface of the elongated base 110 by stitching, the gap extensions 224a and 224b provide for a thinner portion of the top layer 114 for the fasteners 150a and 150b to go through. This resulting thinner material of the top layer 114 results in less stress on the sewing machine used to stitch the thread, and less broken sewing needles. The gap extensions 224a and 224b also allow for an increase in distance of the conductive elements and the associated fasteners from the exterior surface on which the animal deterrent device is applied, which may result in an increased insulation value, since the bottom of the fasteners 150a and 150b are further from any liquid that may pool at the bottom. Generally speaking, gap 222 may take various different shapes in different embodiments as long as gap 222 provides insulation for the conductive elements 130a and 130b and their associated fasteners 150a and 150b.

Figure 10:
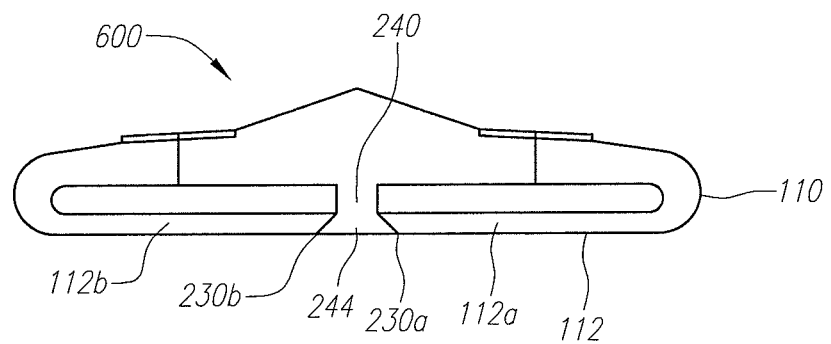
FIG. 10 illustrates a vertical cross sectional view of an alternative embodiment of an animal deterrent device of the present patent document with angled slits.

FIG. 10 illustrates a vertical cross sectional view of yet another embodiment of an animal deterrent device of the present patent document. FIG. 10 illustrates an embodiment of animal deterrent device 600 similar to the embodiment shown in FIG. 5 except for the different position of the slits 230a and 230b. In the embodiment shown in FIG. 10, the slits 230a and 230b are angled inward towards each other. Generally speaking, the slits 230a and 230b may be at any angle. However, angling the slits 230a and 230b, for example at approximately a 45 degree angle towards each other as shown in FIG. 10, helps prevent the various portions of the bottom layer 112 from separating from each other. By angling the slits inward, a dove tail design is formed between the center divider 240 and the flaps 112a and 112b that may be unfolded. This design prevents the flaps 112a and 112b from unfolding without being forced or maneuvered around the center divider 240. In other embodiments, the slits may form other interlocking designs between the flaps 112a and 112b such as a step design or other interlocking design. As described in more detail below, the dove tail shape of the center divider 240 may also be an anchor 244.

Figure 11:
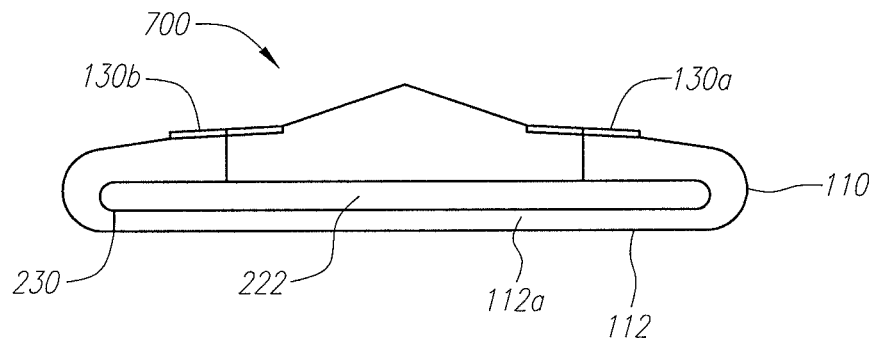
FIG. 11 illustrates a vertical cross sectional view of an alternative embodiment of an animal deterrent device of the present patent document without a center divider, where the slit is toward the edge of the gap.

FIG. 11 illustrates a vertical cross sectional view of another embodiment of an animal deterrent device of the present patent document. The embodiment of animal deterrent device 700 shown in FIG. 11 is similar to the embodiment shown in FIG. 8, except the position of the slit 230 is proximate to an edge of the gap 222. Placing the slit 230 proximate to an edge of the gap 222 allows for the bottom layer 112 to be folded away as one piece instead of two pieces as in other embodiments. The portion of the bottom layer 112 that may be folded away may also be called a flap. In this embodiment, there is also only one gap 222 instead of two gaps as in other embodiments.

Figure 12:
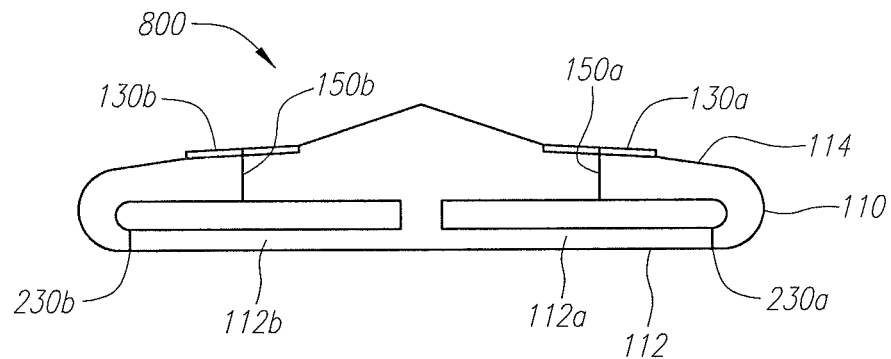
FIG. 12 illustrates a vertical cross sectional view of an alternative embodiment of an animal deterrent device of the present patent document with a center divider, where the slits are toward the edges of the gaps.
Figure 12A:
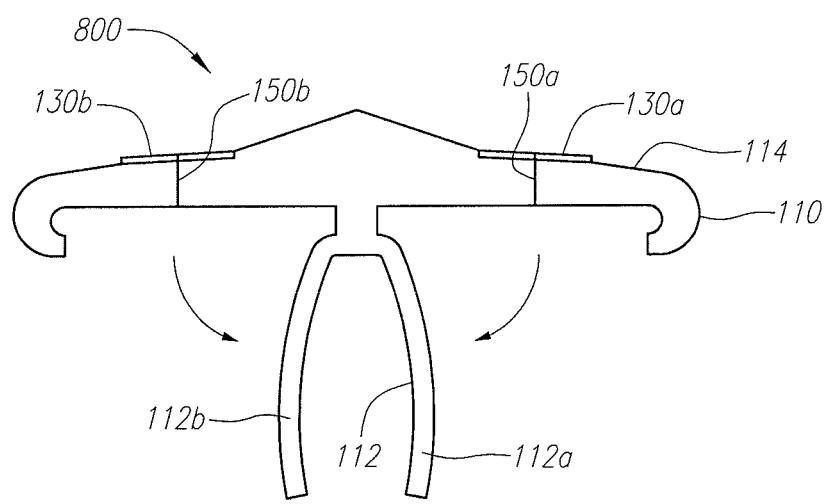
FIG. 12A illustrates a vertical cross sectional view of an alternative embodiment of an animal deterrent device of the present patent document with the bottom layer folded downward instead of outward.

FIG. 12 illustrates yet another embodiment of an animal deterrent device of the present patent document. The embodiment of animal deterrent device 800 of FIG. 12 is similar to the embodiment of FIG. 7, except that in FIG. 12 the slits 230a and 230b are located towards edges of the gaps 220a and 220b. This allows the flaps 112a and 112b to be folded downward and inward towards the center instead of outward towards the edges as shown in FIG. 12A. Locating the slits 230a and 230b towards the edges of the gaps 220a and 220b is one alternative way of cutting the slits 230a and 230b which allows folding the bottom layer 112 away so that conductive elements 130a and 130b may be attached to the top layer 114.

FIG. 12A illustrates the animal deterrent device 800 shown in FIG. 12 with the flaps 112a and 112b in a bent position. This position allows the fasteners 150a and 150b to be attached to the top layer 114 more easily. Generally speaking, bottom layer 112 is preferably made of a material flexible enough to allow flaps 112a and 112b to be bent enough to expose the inside of the top layer 114 of the elongated base 110. In other embodiments, the bottom layer 112 may be detachable, and removed in order to make attaching the fasteners 150a and 150b to the top layer 114 more easily.

Figure 13:
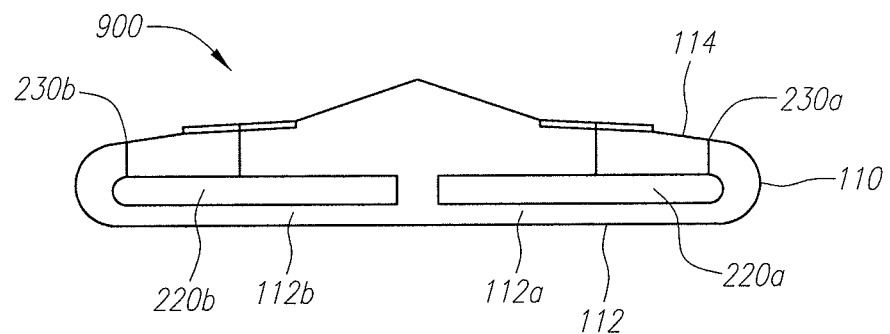
FIG. 13 illustrates a vertical cross sectional view of an alternative embodiment of an animal deterrent device of the present patent document where the slits are in the top layer of the elongated base.

FIG. 13 illustrates another embodiment of an animal deterrent device of the present patent document. The embodiment of animal deterrent device 900 of FIG. 13 is similar to the embodiment of FIG. 7, except that the embodiment of FIG. 13 has slits 230a and 230b in the top layer 114 of the elongated base 110. In this embodiment, the slits 230a and 230b extend from an exterior through the top layer 114 and into the gaps 220a and 220b. Locating the slits 230a and 230b on the top layer 114 is one alternative way of cutting the slits 230a and 230b, which allows folding away of the bottom layer 112 and any portion of the edge of the gaps 220a and 220b or any portion of the top layer 114 that may still be connected to the bottom layer 112 from the remaining portion of the top layer 114.

Figure 14:
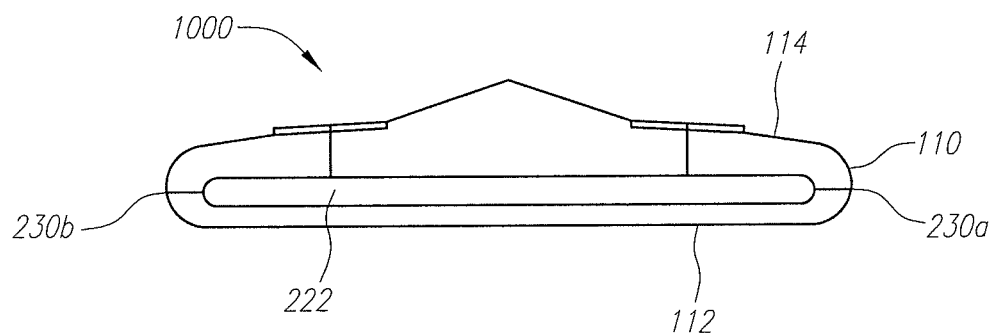
FIG. 14 illustrates a vertical cross sectional view of an alternative embodiment of an animal deterrent device of the present patent document where the slits are in the edges of the gap.

FIG. 14 illustrates yet another embodiment of an animal deterrent device of the present patent document. The embodiment of animal deterrent device 1000 of FIG. 14 is similar to the embodiment of FIG. 8, except that the slits 230a and 230b are made in the sides of the base by outer edge of the gap 222. In this embodiment, the slits 230a and 230b extend from an exterior through the sides of the base 110 and into the gap 222. In this embodiment, the bottom layer 112 may be detached from the top layer 114, which more easily allows for installation of the fasteners 150a and 150b. The bottom layer 112 may be coupled to the top layer 114 by an edge of the gap 222. The slits 230a and 230b may be sealed by methods including, but not limited to, an adhesive.

Figure 15:
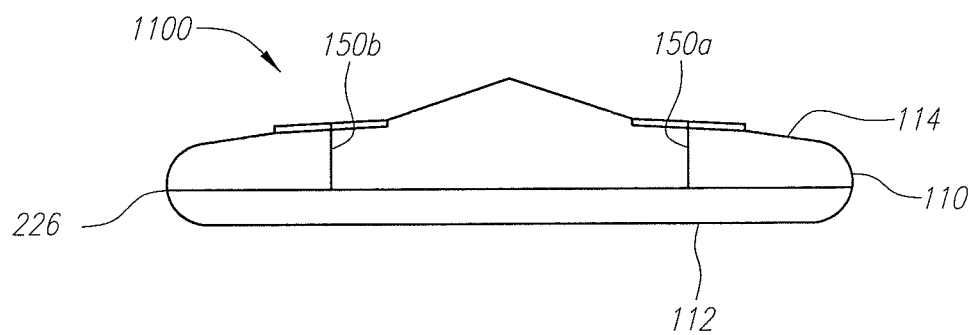
FIG. 15 illustrates a vertical cross sectional view of an alternative embodiment of an animal deterrent device of the present patent document where there is a slit between the top layer and bottom layer.

FIG. 15 illustrates yet another embodiment of an animal deterrent device of the present patent document. The embodiment of animal deterrent device 1100 of FIG. 15 is similar to the embodiment of FIG. 14, except that there is a slit 226 that separates the bottom layer 112 from the top layer 114. This embodiment also allows for the installation of the fasteners 150a and 150b more easily. In the embodiment of FIG. 15, the elongated base 110 further comprises a slit 226 between the first non-conductive piece, the top 114, and the second non-conductive piece, the bottom layer 112, where the two non-conductive pieces are coupled to insulate the fasteners 150a and 150b from the exterior. The slit 226 may also be called a gap. The slit 226 may be any width separating the top layer 114 from the bottom layer 112. The slit 226 may be a gap of any width. The slit 226 may be any shape.

Figure 16:
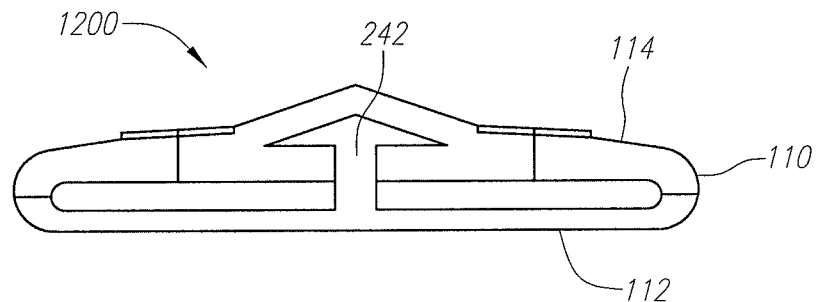
FIG. 16 illustrates a vertical cross sectional view of an alternative embodiment of an animal deterrent device of the present patent document where the center divider also comprises an interlocking shape.

FIG. 16 illustrates yet another embodiment of the animal deterrent device of the present patent document. The embodiment of animal deterrent device 1200 of FIG. 16 is similar to the embodiment of FIG. 14. However, in the embodiment of FIG. 16 the first non-conductive piece, the top 114, is coupled to the second non-conductive piece, the bottom layer 112, by interlocking. In this embodiment, the top layer 114 and the bottom layer 112 are coupled together by the interlocking shape 242 of the center divider 240. Generally speaking, the interlocking shape 242 may be comprised of any shape with interlocking parts. The interlocking shape 242 may be a T-shape, a stemmed inverted V-shape, a stemmed inverted U-shape, a stemmed ball shape, an arrowhead shape, or any other male and female interlocking shape that couples the two pieces together. In other embodiments, the interlocking shape 242 may be located in other locations. In other embodiments, the male portion of interlocking shape 242 may be on the bottom layer 112 or the top layer 114 as long as the receiving female portion is in the corresponding location on the opposite layer to receive the male portion of the interlocking shape 242. Any number of interlocking pieces may be used. In the embodiment shown in FIG. 16, the male portion of the interlocking shape 242 is part of the bottom layer 112, while the corresponding female portion is part of the top layer 114. In other embodiments, the male portion of the interlocking shape 242 may be on the top layer 114, while the female portion may be on the bottom layer 112.

Figure 17:
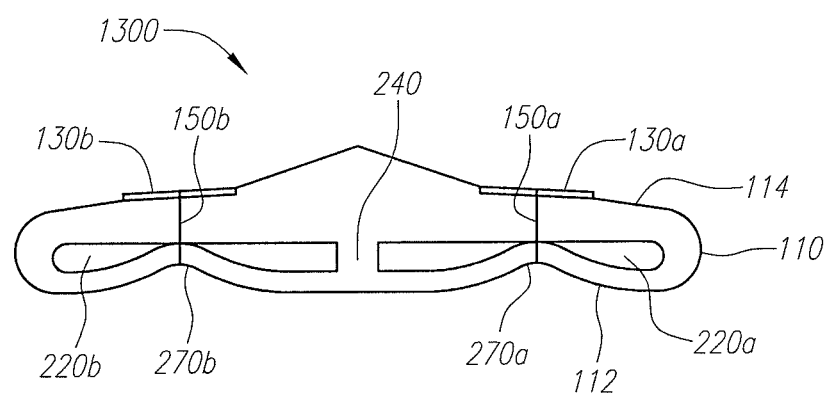
FIG. 17 illustrates a vertical cross sectional view of an alternative embodiment of an animal deterrent device of the present patent document where the fasteners are attached through the bottom layer.

FIG. 17 illustrates another embodiment of the animal deterrent device of the present patent document. The embodiment of animal deterrent device 1300 of FIG. 17 is similar to the embodiment of FIG. 13, except that in the embodiment of FIG. 17 the fasteners 150a and 150b extend from the conductive elements 130a and 130b through the top layer 114, through the gaps 220a and 220b, and through the bottom layer 112. In this embodiment, the fasteners 150a and 150b cause the top side and the bottom side of the gaps 220a and 220b to contact when installed, substantially compressing the gap. In addition, cavities 270a and 270b are created by substantially compressing the gaps 220a and 220b with the fasteners 150a and 150b under each conductive element 130a and 130b. In some embodiments, these cavities 270a and 270b may be filled with a adhesive, such as glue. In this embodiment, the first fastener 150a extends through the bottom layer 112 to a third connection point on the bottom surface of the bottom layer 112.

Figure 18:
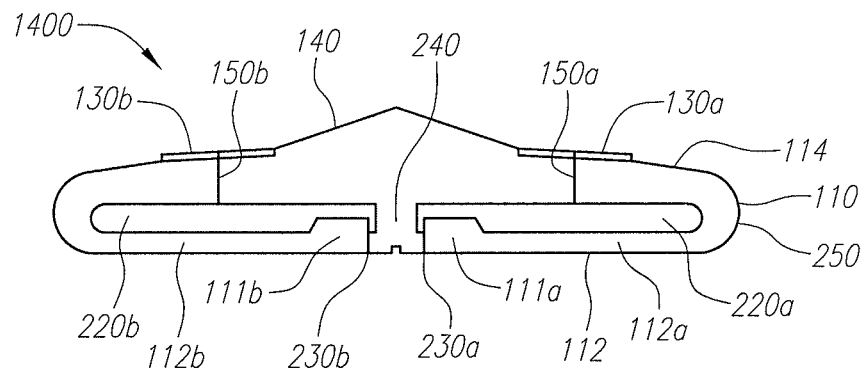
FIG. 18 illustrates a vertical cross sectional view of an alternative embodiment of an animal deterrent device of the present patent document where the thickness of the bottom layer increases proximate to the slits.

FIG. 18 illustrates a vertical cross sectional view of an alternative embodiment of an animal deterrent device of the present patent document. In the embodiment of animal deterrent device 1400 shown in FIG. 18, the thickness of the bottom layer 112 increases proximate to the slits 230a and 230b. The ends of the flaps 112a and 112b of the bottom layer 112 are thicker by the slits 230a and 230b than at other locations on the flaps 112a and 112b in order to prevent the flaps 112a and 112b from bending or sliding upwards towards the top layer 114. The protrusions 111a and 111b instead keep the bottom layer 112 flat with respect to an exterior surface the animal deterrent device is on by preventing the flaps 112a and 112b from bending or folding upwards. In some embodiments, the protrusions 111a and 111b may contact the bottom of the top layer 114. In other embodiments, the ends of the flaps 112a and 112b may only rise some distance toward the top layer 114 without contacting the bottom of the top layer 114. In the embodiment shown in FIG. 18, the protrusions 111a and 111b of the bottom layer 112 extend upward with a flat surface on their top. While the protrusions 111a and 111b in the embodiment shown have a flat surface on their top, in other embodiments the protrusions 111a and 111b may be other shapes. For example, the protrusions 111a and 111b may be square, step, stair-step, or any other shape. In other embodiments, instead of being part of the same molded or extruded shape, separate pieces of material may be added to the flaps 112a and 112b to form the protrusions 111a and 111b and to prevent the flaps 112a and 112b from bending upwards towards the top layer 114.

Figure 19:
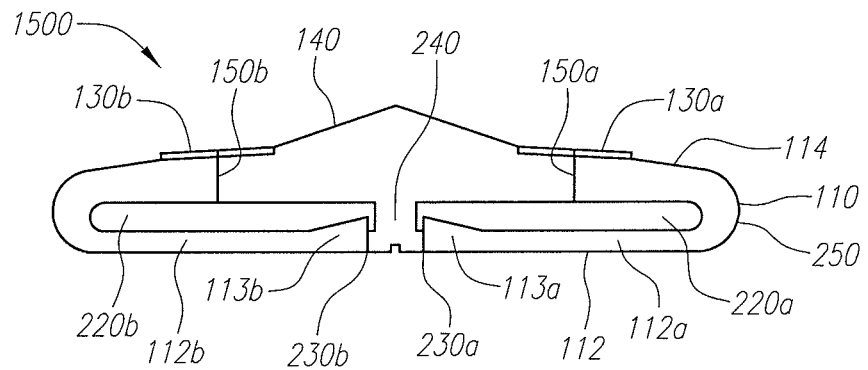
FIG. 19 illustrates a vertical cross sectional view of an alternative embodiment of an animal deterrent device of the present patent document where the ends of the flaps are angled.

FIG. 19 illustrates a vertical cross sectional view of an alternative embodiment of an animal deterrent device of the present patent document. The embodiment of animal deterrent device 1500 shown in FIG. 19, is similar to the embodiment shown in FIG. 18, except that in the embodiment shown in FIG. 19 the protrusions 113a and 113b are angled, or may have a gradual ramp shape. In some embodiments, other material, such as an adhesive or glue, may be added to the tops of the ends of the flaps 113a and 113b to further stabilize the flaps. In another embodiment, the end of the flap 112a has an angled surface on its top, and the end of the flap 112b has a flat surface on its top.

Figure 20:
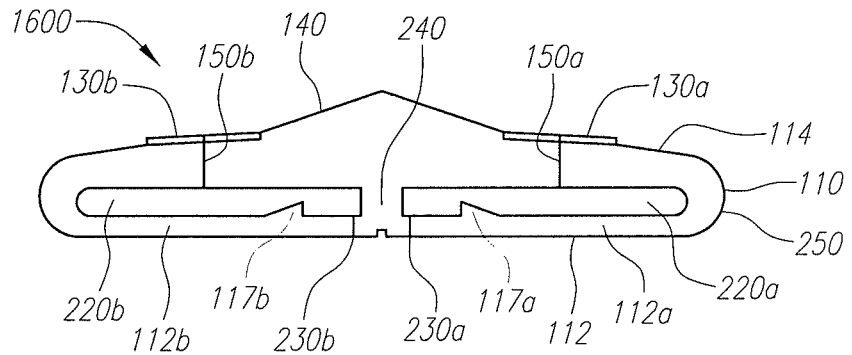
FIG. 20 illustrates a vertical cross sectional view of an alternative embodiment of an animal deterrent device of the present patent document where the protrusions are positioned a distance on the flaps away from the slits.

FIG. 20 illustrates a vertical cross sectional view of an alternative embodiment of an animal deterrent device of the present patent document. The embodiment of animal deterrent device 1600 shown in FIG. 20, is similar to the embodiment shown in FIG. 19, except that in the embodiment shown in FIG. 20 the protrusions 117a and 117b are positioned a distance on the flaps 112a and 112b away from the slits 230a and 230b. The protrusions 117a and 117b may be any size and shape.

The protrusions, such as the protrusions in FIGS. 14-16 for example, may help to keep the base 110 flat with respect to an exterior surface after an adhesive is applied to the exterior surface of the bottom layer 112. As described below and shown in FIG. 22, when the adhesive 160 is applied, in some embodiments, the flaps 112a and 112b tend to bend upwards into the gaps 220a and 220b. The addition of the protrusions give the flaps 112a and 112b less space in which to bend, as the protrusions cause the flaps 112a and 112b to contact the bottom of the top layer 114 after a lesser degree of bending, than the flaps 112a and 112b would undergo without the protrusions. This in turn would result in less adhesive being disposed between the bottom layer and the exterior surface.

Figure 21:
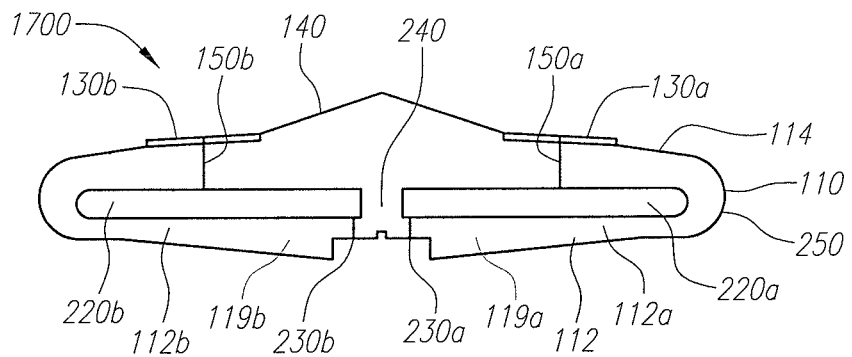
FIG. 21 illustrates a vertical cross sectional view of an alternative embodiment of an animal deterrent device of the present patent document where the protrusions are extending downward instead of upward into the gaps.

FIG. 21 illustrates a vertical cross sectional view of an alternative embodiment of an animal deterrent device of the present patent document. The embodiment of animal deterrent device 1700 shown in FIG. 21, is similar to the embodiment shown in FIG. 20, except that in the embodiment shown in FIG. 21 the protrusions 119a and 119b are extending downward towards an exterior surface (not shown) instead of upward into the gaps 220a and 220b as in FIG. 20. When an adhesive is applied to the bottom surface of the bottom layer 112, the flaps 112a and 112b are pushed up towards the top layer 114, but the bottom surface of the bottom layer 112 remains substantially flat with respect to the exterior surface on which the animal deterrent device is attached due to the protrusions 119a and 119b.

In FIG. 21, the protrusions 119a and 119b are positioned not adjacent to the slits 230a and 230b but are some distance on the flaps away from the slits 230a and 230b. In other embodiments, the protrusions 119a and 119b may be adjacent the slits 230a and 230b. The protrusions 119a and 119b may be any size and shape, as long as they make the thickness of a portion of a flap 112a and 112b proximate to a slit 230a and 230b thicker than a portion of the flap 112a and 112b further from a slit 230a and 230b.

Figure 22:
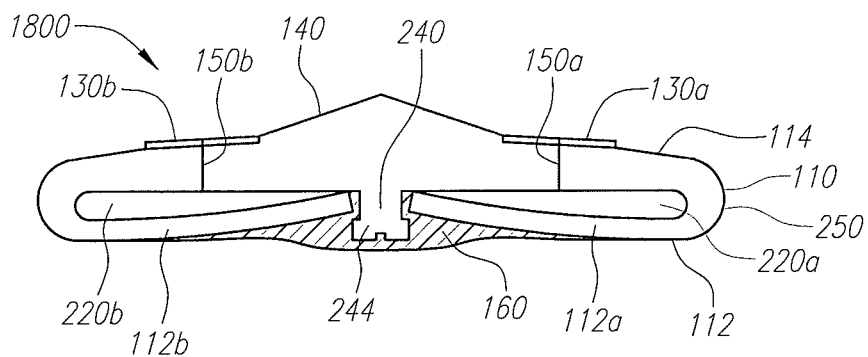
FIG. 22 illustrates a vertical cross sectional view of an alternative embodiment of an animal deterrent device of the present patent document where the anchor is embedded into an adhesive.

FIG. 22 illustrates a vertical cross sectional view of an alternative embodiment of an animal deterrent device of the present patent document. The embodiment of animal deterrent device 1800 shown in FIG. 22, is similar to the embodiment shown in FIG. 6, except that in the embodiment shown in FIG. 22 the center divider 240 is embedded into an adhesive 160 by the anchor 244. In some embodiments, the center divider 240 further comprises the anchor 244. In some embodiments, the center divider 240 may also be an anchor. The anchor 244 may also be referred to as a glue anchor, a glue lock, or glue spine. In some embodiments, the anchor 244 is a portion of the center divider 240 where an area proximate to the bottom of the center divider 240 that has a greater width than other locations along its length. In some embodiments, the center divider 240 may be an inverted T-shape. The inverted T-shape operates as an anchor, creating a greater surface area for the adhesive 160 to grip. In FIG. 22, the anchor 244 is shown embedded into the adhesive 160. In another embodiment, the anchor further comprises a ridge wherein the adhesive 160 is disposed on a top surface of the ridge after the pressing step 2304 further described below and in FIG. 27. In one embodiment, during installation, the anchor 244 embeds itself into the adhesive 160 first, when the animal deterrent device is pressed toward an exterior surface, the remaining adhesive works its way towards the edges of the animal deterrent device, ensuring a tight grip. The adhesive 160 may be applied to the bottom layer 112, or to the external surface. In a preferred embodiment, where the anchor is located in the center of the animal deterrent device, such as in FIG. 22, the adhesive 160 is applied to the center of the animal deterrent device. In some embodiments, the adhesive 160 may be glue. In some embodiments, the anchor 244 may be located in the center of the animal deterrent device as in FIG. 22. In one embodiment, the anchor 244 may have an upward facing surface substantially parallel to the bottom layer 112 such as shown in FIG. 22. In another embodiment, the anchor 244 may be the shape shown in FIG. 10 with an upward facing surface that is angled. The anchor 244 may be any shape such that the anchor 244 has a greater surface area such that an adhesive can adhere to.

In other embodiments, the anchor 244 may be located in any location of the animal deterrent device, such as on the sides, or towards an edge, as long as the anchor may be pressed into the adhesive 160 during installation. In such embodiments, the anchor 244 may extend from the bottom surface of the top layer 114 proximate to the bottom of a shape similar to the center divider 240, but not located in the center of the device. In some embodiments, the anchor is substantially perpendicular to the top layer.

In some embodiments, the flaps 112a and 112b may instead be secured first to the anchor 244 creating a flat bottomed base 110 of the base 110, for example by gluing, prior to application of the base 110 to the exterior surface. The base 110 may then be secured to the exterior surface.

Figure 23:
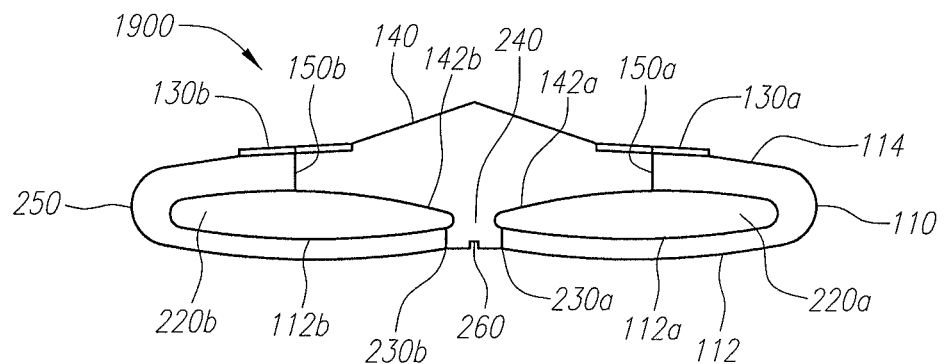
FIG. 23 illustrates a vertical cross sectional view of another embodiment of an animal deterrent device of the present patent document where the thickness of the gaps taper down proximate to the anchor.

FIG. 23 illustrates a vertical cross sectional view of another embodiment of the animal deterrent device of the present patent document. In the embodiment of animal deterrent device 1900 shown in FIG. 23, the thickness of the gaps 220a and 220b taper down proximate to the center divider 240. The top layer 114 proximate to the center divider 240 is tapered, or thicker by the center divider 240 than at other locations of the top layer 114, in order to prevent the flaps 112a and 112b from bending or sliding upwards towards the top layer 114. These tapered portions 142a and 142b help to keep the bottom layer 112 flat with respect to an exterior surface the animal deterrent device is on by preventing the flaps 112a and 112b from bending or folding upwards. In some embodiments, flaps 112a and 112b may contact tapered portions 142a and 142b of the top layer 114. In the embodiment shown in FIG. 23, tapered portions 142a and 142b are curved portions of the bottom of the top layer 114, and the gaps 220a and 220b are ovular or rounded in shape. In other embodiments the tapered portions 142a and 142b and the gaps 220a and 220b may be other shapes. In other embodiments, instead of being part of the same molded or extruded shape, separate pieces of material may be added to the bottom of the top layer 114 to form the tapered portions 142a and 142b and to prevent the flaps 112a and 112b from bending upwards. In other embodiments, the bottom flaps 112a and 112b may be curved. In some embodiments, the shape of FIG. 23 may be how the shape of the elongated base 110 looks when it exists the tool from which it is manufactured, even though the tool from which it is manufactured is shaped similar to the cross-sectional view of the elongated base 110 of FIG. 6.

Figure 24:
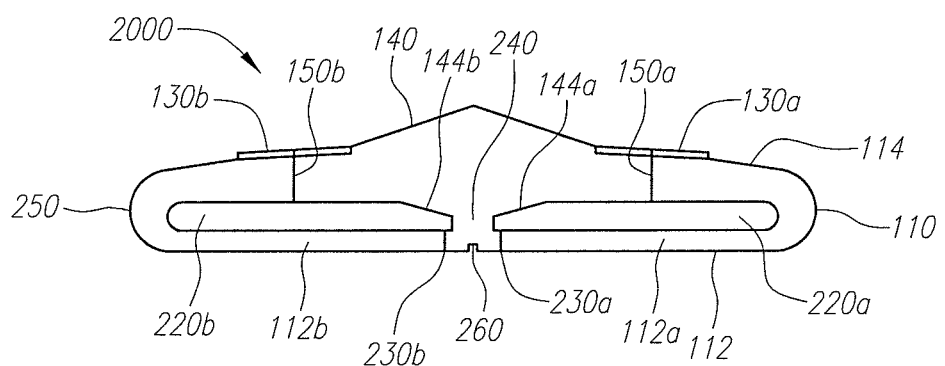
FIG. 24 illustrates a vertical cross sectional view of an alternative embodiment of an animal deterrent device of the present patent document where the tapered portions are angled.

FIG. 24 illustrates a vertical cross sectional view of an alternative embodiment of an animal deterrent device of the present patent document. The embodiment of animal deterrent device 2000 shown in FIG. 24, is similar to the embodiment shown in FIG. 23, except that in the embodiment shown in FIG. 24 the tapered portions 144a and 144b are angled, or may have a gradual ramp shape. In other embodiments, other shapes of the tapered portions 144a and 144b may be used, provided that they help to prevent the flaps 112a and 112b from bending upwards towards the top layer 114.

Figure 25:
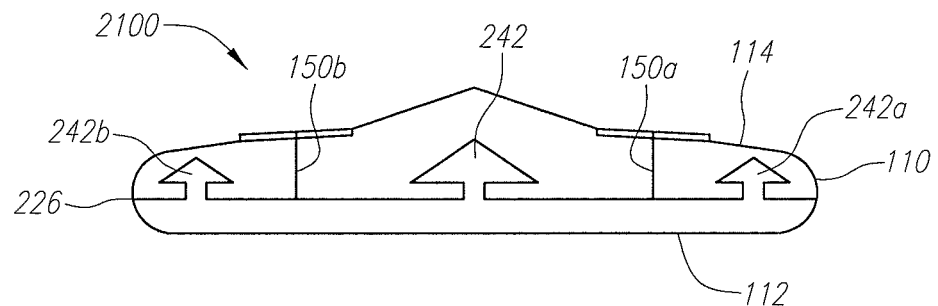
FIG. 25 illustrates a vertical cross sectional view of an alternative embodiment of an animal deterrent device of the present patent document where there are interlocking shapes on the sides that help to hold the bottom layer to the top layer.

FIG. 25 illustrates yet another embodiment of an animal deterrent device of the present patent document. The embodiment of animal deterrent device 2100 of FIG. 25 is similar to the embodiments of FIG. 15 and FIG. 16, except that there are interlocking shapes on the sides that help to hold the bottom layer 112 to the top layer 114. This embodiment also allows for the installation of the fasteners 150a and 150b more easily. In this embodiment, the top layer 114 and the bottom layer 112 comprise an interlocking shape of the center divider 240. In other embodiments, the animal deterrent device may only have the two interlocking shapes 242a and 242b, without the interlocking shape of center divider 240. In the embodiment of FIG. 25, the elongated base 110 further comprises a slit 226 between the first non-conductive piece, the top layer 114, and the second non-conductive piece, the bottom layer 112, where the two non-conductive pieces are coupled to insulate the fasteners 150a and 150b from the exterior. The slit 226 may also be called a gap. The slit 226 may be any width separating the top layer 114 from the bottom layer 112, provided that they couple together by interlocking shapes. The slit 226 may also be any shape. The interlocking shapes may be a T-shape, a stemmed inverted V-shape, a stemmed inverted U-shape, a stemmed ball shape, an arrowhead shape, or any other male and female interlocking shape that couples the two pieces together. In other embodiments, the interlocking shapes may be located in other locations, provided they hold the separate layers of the elongated base 110 together. Any number of interlocking shapes may be used. In other embodiments, any of the male interlocking shapes may be on the bottom layer 112 or the top layer 114 as long as each receiving female portion is in the corresponding location on the opposite layer to receive the male interlocking shape. In another embodiment, just one interlocking shape is used substantially in the center of the animal deterrent device leaving the edges open and free to bend away exposing the inside surface of the top layer 114.

Figure 26:
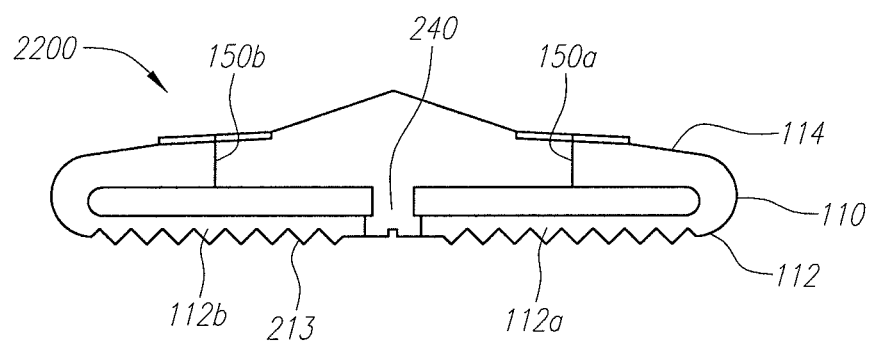
FIG. 26 illustrates a vertical cross sectional view of an alternative embodiment of an animal deterrent device of the present patent document where the bottom layer is ridged to increase the bottom surface area of the elongated base.

FIG. 26 illustrates yet another embodiment of an animal deterrent device of the present patent document. The embodiment of animal deterrent device 2200 of FIG. 26 is similar to the embodiment of FIG. 6 except that the bottom layer 112 has ridges 213 to increase the bottom surface area of the elongated base 110. In FIG. 26 a surface area of the bottom surface of the bottom layer 112 is increased over a substantial portion of the bottom surface of the bottom layer. The ridges 213 preferably extend axially along the length of the elongated base 110. An adhesive may be applied between the ridged bottom surface of the bottom layer 112 and an exterior surface, such that the glue has a greater surface area to adhere to on the elongated base 110, than if there were a flat base as in some of the other embodiments shown herein. In some embodiments, though the ridges 213 increase the surface area of the bottom surface of the bottom layer 112, the ridges 213 should be small enough so that the adhesive used is the minimal amount necessary for maximum adhesion or bonding strength to the exterior surface. As shown in FIG. 26, the ridges 213 cover a substantial portion of the cross-sectional width of the bottom surface of the bottom layer 112. In some embodiments, any number of ridges may be used. The animal deterrent device of FIG. 26 is shown with angled ridges 213, but rounded, square, or other shapes may be used as long as they increase the surface area of the bottom layer 112. In some embodiments, the ridged pattern may be repeatable shapes. In other embodiments, the bottom surface may have non-repeating shapes. The ridged bottom surface may also be referred to as jagged or toothed. In other embodiments, the bottom surface may be corrugated or ribbed.

Figure 27:
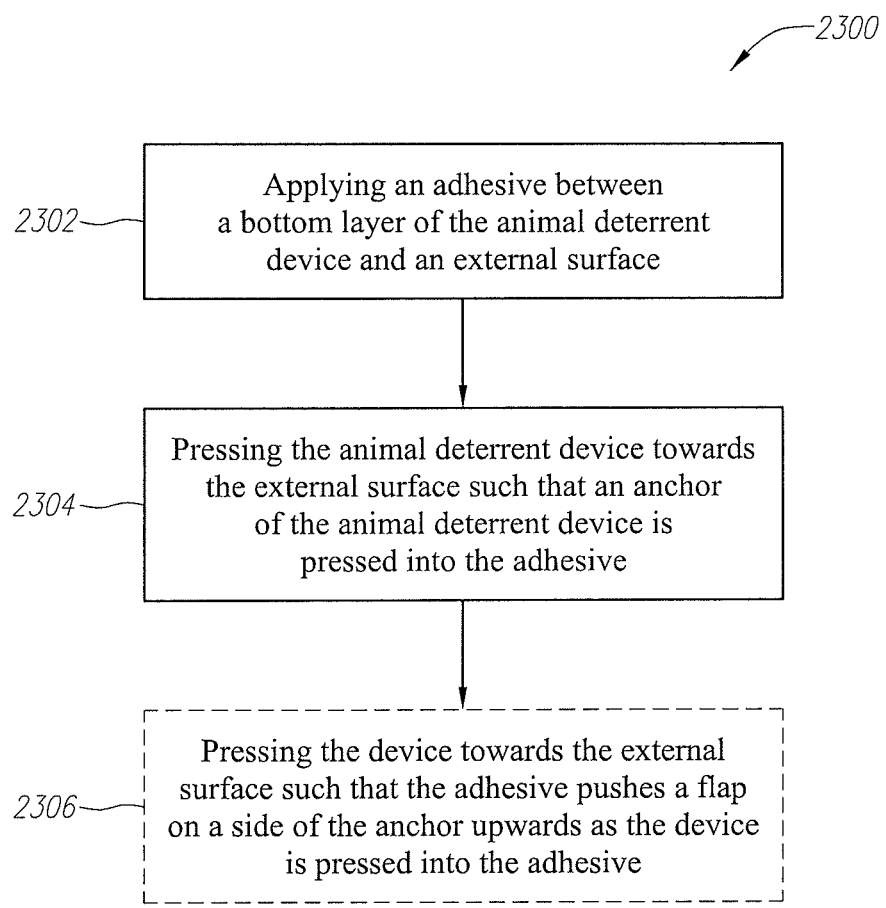
FIG. 27 illustrates an embodiment of a method for installing an animal deterrent device.

Referring now to FIG. 27, an embodiment of a method 2300 is shown. FIG. 27 illustrates an embodiment of a method 2300 for installing an animal deterrent device. In step 2302, an adhesive 160 is applied between a bottom layer 112 of the animal deterrent device, and an external surface. In step 2304, the animal deterrent device is pressed towards the external surface such that such that an anchor of the animal deterrent device is pressed into the adhesive 160. In step 2306, the adhesive 160 enters a space between the anchor and the flap as the animal deterrent device is pressed towards the external surface. In one embodiment, when the animal deterrent device is pressed down, the adhesive 160 also creeps out towards the edges so a substantial portion or all of the elongated base 110 is glued down, and not just a strip down the center.

In some embodiments of the method shown in FIG. 27, the pressing step further comprises pressing the animal deterrent device towards the external surface such that the adhesive pushes flaps 112a and 112b on the sides of the anchor 244 upwards towards the top layer 114 as the animal deterrent device is pressed into the adhesive. In another embodiment, the adhesive 160 enters a space between the anchor 244 and the flaps 112a and 112b as the animal deterrent device is pressed towards the external surface. In yet another embodiment, a portion of the anchor proximate to its bottom is thicker than a portion of the anchor further from its bottom. In certain embodiments, the anchor may be an inverted T shape. In another embodiment, the anchor further comprises a ridge wherein the adhesive 160 is disposed on a top surface of the ridge after the pressing step.

Figure 28:
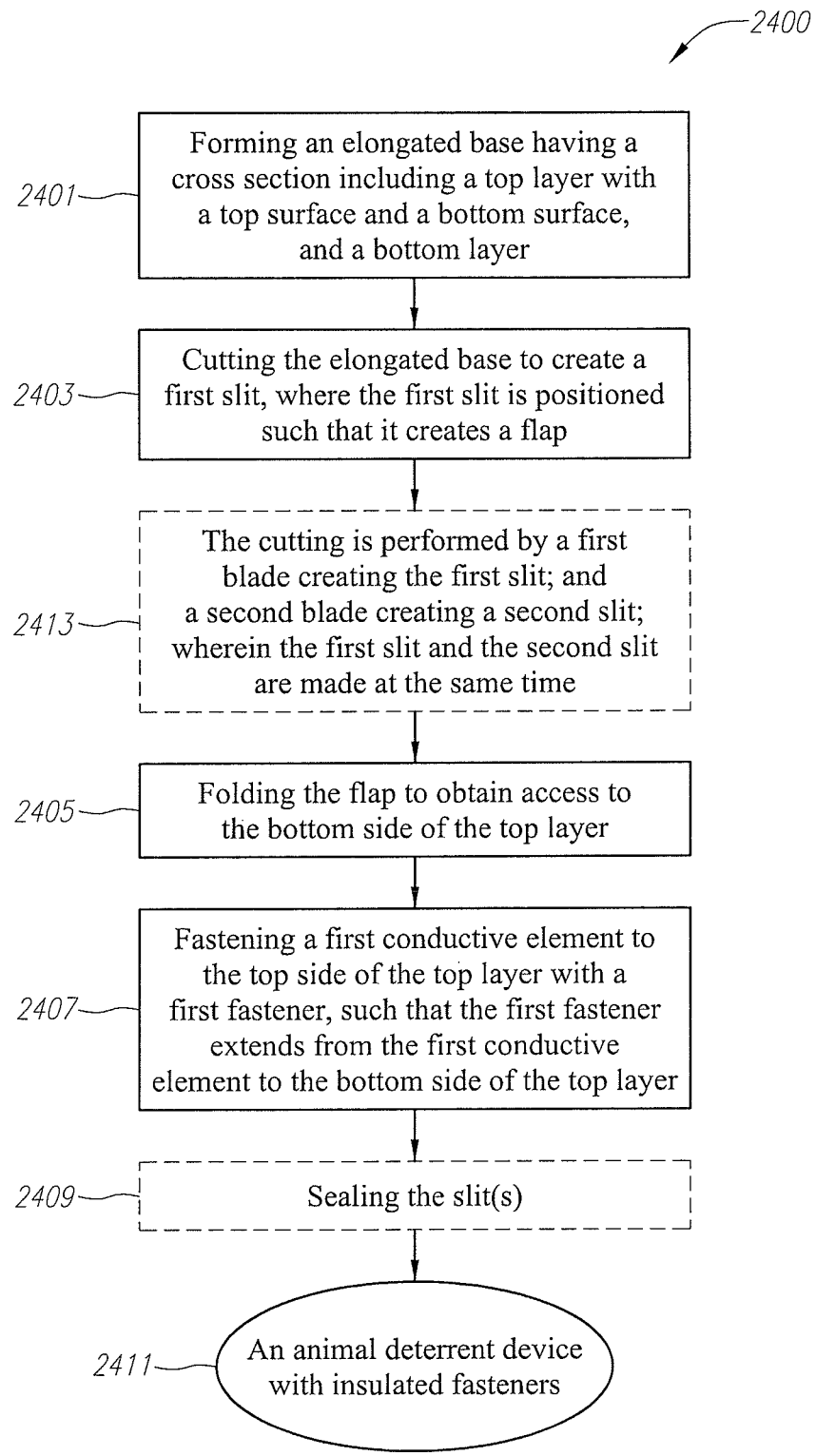
FIG. 28 illustrates a process for producing some embodiments of the present patent document.

Referring now to FIG. 28, an embodiment of a process 2400 is shown. FIG. 28 illustrates an embodiment of a process 2400 for producing an animal deterrent device. Step 2401 of the process 2400 comprises forming an elongated base having a cross section including a top layer with a top surface and a bottom surface, and a bottom layer. In a preferred embodiment, the elongated base 110 is formed by extruding. In other embodiments, other methods such as casting, thermoforming, molding, or any other method may be used to form the elongated base 110. Next, step 2403 may be performed by cutting the elongated base 110 to create a first slit 230a, where the first slit 230a is positioned such that it creates a flap 112a. In some embodiments, the cutting may take place as described in cutting step 2413 where the first slit 230a and second slit 230b are made or cut at the same time. The cutting step 2413 may be performed instead of, simultaneously with, or in addition to cutting step 2403. In cutting step 2413, two slits 230a and 230b are cut into the elongated base 110. In one embodiment, the cutting is performed by a first blade creating the first slit, and a second blade creating the second slit, wherein the first slit 230a and the second slit 230b are made at the same time. In another embodiment, the first blade is parallel to the second blade. In some embodiments, the two blades may be angled inward towards each other, such that the blades form an inverted V-shape with a space between them. The resulting cuts made by the first blade creating a first slit 230a and a second blade creating a second slit 230b, may create a point of resistance that may help to hold the flaps 112a and 112b up and in place after the cut, as illustrated in FIG. 10. In some embodiments, the cuts creating the slits may be performed simultaneously. In other embodiments, the slits may created by a first cut at one time and then a second cut at a second later time, for example, by running the base over one blade to make one slit, and then a second blade to create the second slit. Generally speaking, the cut or cuts may be made in any location of the elongated base. Once a cutting step is performed, step 2405 may be performed by folding the flap to obtain access to the bottom side of the top layer. In some embodiments, the step 2405 may be performed by folding the bottom layer away from the slit 230, or from the slits 230a and 230b, to expose the bottom side of the top layer 114 to an exterior. In the embodiment shown in FIG. 28, step 2407 follows step 2405 and comprises fastening a first conductive element 130a to the top side of the top layer 114 with a first fastener 150a, such that the first fastener 150a extends from the first conductive element 130a to the bottom side of the top layer 114. In some embodiments an adhesive may be applied to the gaps 220a and 220b of the elongated base 110. The adhesive may also help to further insulate the fasteners 150a and 150b from the exterior. In optional step 2409, the slits may be sealed. The slits may be sealed by gluing, heat-melting, stitching, or by other methods, including, but not limited to, screws, bolts, staples, nails, any other method, or a combination thereof, as long as such that the slits are sealed to further insulate the fasteners 150a and 150b from an undesirable material such as water that could cause unwanted short circuiting of the animal deterrent device. The process shown in FIG. 28 produces a product 2411 that comprises an animal deterrent device with insulated fasteners 150a and 150b. In some embodiments, the flaps 112a and 112b may instead be secured to create a flat bottomed base 110 of the base 110, for example by gluing the slit 230, or slits 230a and 230b, prior to application of the base 110 to the exterior surface. In some embodiments, the flaps 112a and 112b may be secured to the center divider 240. In other embodiments the flaps 112a and 112b may be secured to other locations on the animal deterrent device. The base 110 may then be secured to the exterior surface.

Figure 29:
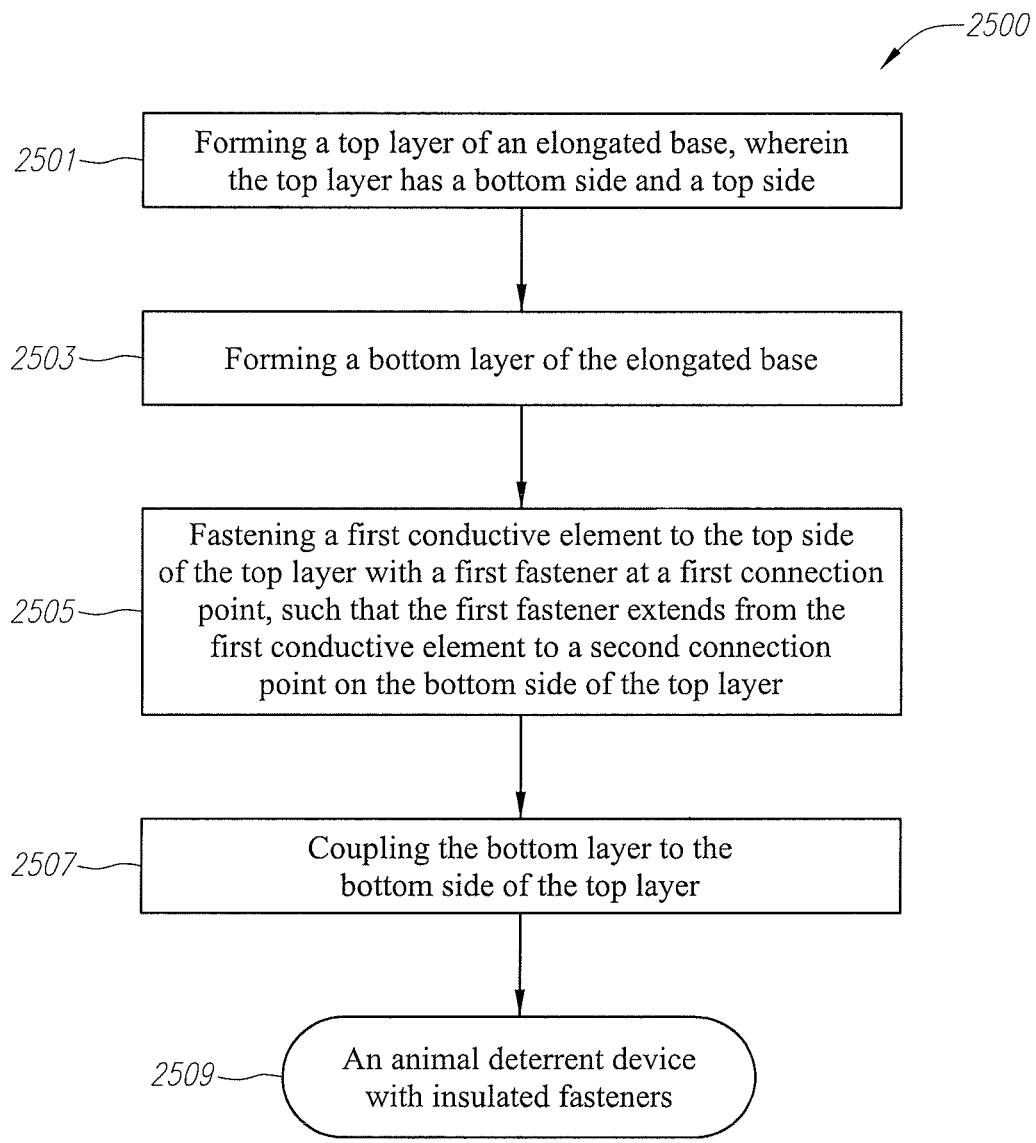
FIG. 29 illustrates a process for producing additional embodiments of the present patent document.

Referring now to FIG. 29, an embodiment of a process 2500 is shown. FIG. 29 illustrates an embodiment of a process 2500 for producing an animal deterrent device. Step 2501 comprises forming a top layer 114 of an elongated base 110, wherein the top layer 114 has a bottom side and a top side. In step 2503 the process involves forming a bottom layer 112 of an elongated base 110. Step 2505 comprises fastening a first conductive element 130a to the top side of the top layer 114 with a first fastener 150a at a first connection point, such that the first fastener 150a extends from the first conductive element 130a to a second connection point on the bottom side of the top layer 114. In another embodiment, a second conductive element 130b is fastened to the top side of the top layer 114 with a second fastener 150b. In step 2507, the bottom layer 112 is coupled to the bottom side of the top layer 114. The process shown in FIG. 29 produces a product 2509 that comprises an animal deterrent device with insulated fasteners 150a and 150b. The bottom layer 112 insulates the first fastener 150a at the second connection point from an exterior. The bottom layer 112 may be coupled to the top layer 114 by any method that results in insulated fasteners. In one embodiment bottom layer 112 may be coupled to the top layer 114 by an adhesive. In another embodiment, the bottom layer 112 may coupled to the top layer 114 by stitching. In a preferred embodiment of the process in FIG. 29, the forming steps of creating the top layer 114 and the bottom layer 112 of the elongated base 110 are performed by extrusion.

The animal deterrent device is preferably attached to the surface of the edge of the building or place where the pests or birds are to be deterred. Attachment may be by any mechanical means such as screw, bolts, staples, nails, an adhesive such as glue, or any other attachment means, or any combination. The elongated base 110 may be of any shape and size as dictated by the specific size and type of animal, bird or pest to be deterred, and the area to which the animal deterrent device is to be installed, so long as the two electrically conductive elements 130a and 130b are kept a sufficient distance apart so as to prevent unwanted short circuiting, and are not so far apart at to not be short-circuited when the intended-to-be deterred animal, pest or bird contacts the animal deterrent device. The elongated base 110 may be constructed of any material so long as there is sufficient non-conductive material immediately adjacent the conductive elements 130a and 130b so as to prevent unwanted short circuiting. In a preferred embodiment, the entire elongated base 110 is made of a single material, in this case extruded polyvinyl chloride that is extremely flexible, durable and UV resistant, and is sufficiently soft so as to allow for the sewing operation whereby the conductive elements 130a and 130b may be sewn directly to the elongated base 110. The elongated base 110 may be constructed of any color so as to blend with the structure to which it will ultimately be attached. It is not necessary that the elongated base 110 be of unitary material and construction. In some embodiments, cellular, flex or rigid polyvinyl chloride may be used as a material for construction of the elongated base 110. In other embodiments, other possible materials for construction of the elongated base 110 may include, but are not limited to, neoprene, fluoroelastomer (available commercially under trademarks Vitron® and Flourel 8), silicone, natural rubber, buna N (nitrile), buna S (SBR), thermoplastic rubber, synthetic polyisoprene, EPDM and polyurethane.

In a preferred embodiment, the conductive elements 130a and 130b are comprised of elongated individual strands that are braided in a length-wise substantially curvilinear fashion. In other embodiments, the conductive elements may be constructed from a mesh comprised of separate warp and weft strands that are arranged in a substantially perpendicular relationship to one another. A few strands of a very strong, albeit non-conductive material might be desired to add even more strength and durability. In some embodiments, a conductive element may be made of metal. While flat braids are preferred, non-flat braided material could also be used. Also, while stainless steel is preferred for the conductive elements, iron, steel, copper, and zinc plated copper are just some examples of many other conductive materials that could be substituted.

The preferred means for attaching the conductive elements 130a and 130b to the elongated base 110 is by sewing, especially where the conductive elements 130a and 130b are braided, mesh, or other interconnected woven configuration. While any suitably durable and string thread may be used in the sewing operation, 100% polyester has proven suitable. A single line of stitching illustrated as fasteners 150a and 150b down the longitudinal center of each conductive element 130a and 130b (best seen in FIG. 5) has proven sufficient, although many other sewing stitches, styles and placement would work as well. As shown in FIG. 5, the fasteners 150a and 150b could also represent staples or any other fastener.

Other attachment means for attaching the conductive elements 130a and 130b to the elongated base 110 could be used instead of or in addition to sewing. For example, the conductive elements 130a and 130b could also be glued or heat-melted to the elongated base 110, or stapled, or bolted, or screwed into place on the elongated base 110. However, it is believed that for ease of construction, for durability, and for attractiveness, sewing is preferred.

In some embodiments, the ends of conductive elements 130a and 130b are attached to the terminals of a conventional power source (not shown). In other embodiments, the conductive elements 130a and 130b may be attached to the terminals of a conventional power source at locations other than at the ends of the conductive elements 130a and 130b through the use of clamps, clips, inserts or other similar ways of connecting conductive elements to a power source. A charge of approximately 800 volts alternating current, at low ampere (10 mA) or 7.5 KV, 3 amp direct current, has proven effective to deter birds. Larger voltages and amperes may be necessary for larger animals. If the desire was to execute the pest rather than simply deter, then the voltages and amperes would have to be increased accordingly, and the current bearing characteristics of the conductive elements 130a and 130b would have to be adjusted accordingly as well.

Although the embodiments have been described with reference to the drawings and specific examples, it will readily be appreciated by those skilled in the art that many modifications and adaptations of the apparatuses and processes described herein are possible without departure from the spirit and scope of the embodiments as claimed hereinafter. Thus, it is to be clearly understood that this description is made only by way of example and not as a limitation on the scope of the embodiments as claimed below.

What is claimed is:

1. A process for producing an animal deterrent device, the process comprising the steps of:
    forming an elongated base having a cross section including a top layer with a top surface and a bottom surface, and a bottom layer;
    cutting the elongated base to create a first slit, where the first slit is positioned such that it creates a flap;
    folding the flap to obtain access to the bottom side of the top layer; and fastening a first conductive element to the top side of the top layer with a first
    fastener, such that the first fastener extends from the first conductive element to the bottom side of the top layer.

2. The process of claim 1, further comprising the step of sealing the first slit.

3. The process of claim 2, wherein the first slit is sealed with an adhesive.

4. The process of claim 1, wherein the cutting step is performed by a first blade creating the first slit; and
    a second blade creating a second slit.

5. The process of claim 4, wherein the first slit and the second slit are made at the same time.

6. The process of claim 5, wherein the first blade is parallel to the second blade.

7. The process of claim 6, wherein the first blade and the second blade are angled towards each other.

8. The process of claim 1, wherein the forming step is performed by extruding the elongated base.

9. The process of claim 1, wherein the first slit is cut in the bottom layer.

10. The process of claim 1, wherein the first slit is cut in the top layer.

* * * * *